(12) United States Patent
Belitz et al.

(10) Patent No.: US 8,367,919 B2
(45) Date of Patent: Feb. 5, 2013

(54) MUSICAL SUPPORT APPARATUS

(75) Inventors: Michael Belitz, Manhattan Beach, CA (US); Robin R. Slaton, Fort Collins, CO (US); Allen Killebrew, Longmont, CO (US)

(73) Assignee: Swift Distribution, Inc., Torrance, CA (US)

( * ) Notice: Subject to any disclaimer, the term of this patent is extended or adjusted under 35 U.S.C. 154(b) by 38 days.

(21) Appl. No.: 12/863,168

(22) PCT Filed: Jan. 15, 2009

(86) PCT No.: PCT/US2009/031162
§ 371 (c)(1),
(2), (4) Date: Jan. 18, 2011

(87) PCT Pub. No.: WO2009/091929
PCT Pub. Date: Jul. 23, 2009

(65) Prior Publication Data
US 2011/0154975 A1    Jun. 30, 2011

Related U.S. Application Data

(60) Provisional application No. 61/011,315, filed on Jan. 15, 2008, provisional application No. 61/144,649, filed on Jan. 14, 2009.

(51) Int. Cl.
*G10D 9/00* (2006.01)
(52) U.S. Cl. ...................................................... 84/453
(58) Field of Classification Search .................... 84/453; D6/462
See application file for complete search history.

(56) References Cited

U.S. PATENT DOCUMENTS

| D18,940 S | 2/1889 | Jackson |
| 688,623 A | 12/1901 | Forry |
| 824,596 A | 6/1906 | Smith |
| D120,114 S | 4/1940 | Waechter |
| D137,960 S | 5/1944 | Hagar |
| D139,445 S | 11/1944 | Barger |
| 2,662,164 A * | 12/1953 | Murray ........................ 362/98 |

(Continued)

FOREIGN PATENT DOCUMENTS

| CA | 2594892 | 7/2005 |
| CA | 122836 | 9/2008 |

(Continued)

OTHER PUBLICATIONS

Konig & Meyer Spider Keyboard Stand, audioMIDI.com Dec. 28, 2004.

(Continued)

*Primary Examiner* — Jianchun Qin
(74) *Attorney, Agent, or Firm* — Santangelo Law Offices, P.C.

(57) ABSTRACT

Embodiments of the inventive technology relate generally to item support apparatus. Although a focus of the inventive technology may, in some embodiments, be on support of musical related items such as musical instruments, keyboards, and sound speakers, the scope of the inventive technology and its applicability is not necessarily limited as such. In various embodiments, certain inventive technology provides enhanced functionality (e.g., stand adjustability), robust and simplified design (e.g., as may be found in a retention augmented item stand), enhanced performance (as may be found in a telescoping tube lock apparatus), and an ability to more easily control the elevation and lowering of heavy, stand supported items such as speakers.

9 Claims, 39 Drawing Sheets

U.S. PATENT DOCUMENTS

| | | | |
|---|---|---|---|
| 3,338,539 A | 8/1967 | Foster | |
| D257,987 S | 1/1981 | Schoenig | |
| 4,321,874 A | 3/1982 | Cenna | |
| D264,852 S | 6/1982 | Schoenig | |
| D268,458 S | 4/1983 | Schoenig | |
| 4,445,415 A | 5/1984 | Izquierdo | |
| D288,755 S | 3/1987 | Schoenig | |
| D289,952 S | 5/1987 | Kido | |
| D290,355 S | 6/1987 | Nagele | |
| 4,669,691 A | 6/1987 | Solomon | |
| 4,671,479 A | 6/1987 | Johnson et al. | |
| 4,763,865 A * | 8/1988 | Danner | 248/164 |
| 4,770,380 A * | 9/1988 | Eason et al. | 248/165 |
| D304,270 S | 10/1989 | Goldman | |
| D306,943 S | 4/1990 | Hodge et al. | |
| 4,917,341 A | 4/1990 | Pirchio | |
| 4,988,064 A | 1/1991 | Hoshino | |
| 4,988,150 A | 1/1991 | Lindow et al. | |
| 5,029,796 A | 7/1991 | Schoenig | |
| D320,034 S | 9/1991 | Brooks et al. | |
| 5,048,789 A | 9/1991 | Eason et al. | |
| D321,293 S | 11/1991 | Kucsak | |
| D323,081 S | 1/1992 | Schaffer | |
| 5,112,020 A | 5/1992 | Ginsberg | |
| D326,969 S | 6/1992 | Eason et al. | |
| D329,342 S | 9/1992 | Schoenig | |
| 5,165,635 A | 11/1992 | Hoshino | |
| 5,188,321 A | 2/1993 | Hirschenson et al. | |
| 5,199,930 A | 4/1993 | Weber | |
| D335,889 S | 5/1993 | Gibran | |
| 5,208,736 A | 5/1993 | Crooks et al. | |
| D336,099 S | 6/1993 | Schoenig | |
| 5,251,925 A | 10/1993 | Haley, Sr. | |
| 5,301,910 A | 4/1994 | Lang et al. | |
| 5,312,076 A | 5/1994 | Rogov | |
| 5,322,250 A | 6/1994 | Wilhite, Jr. | |
| 5,358,204 A | 10/1994 | Terada | |
| 5,390,764 A | 2/1995 | Kerber | |
| 5,392,476 A | 2/1995 | Williams | |
| 5,395,088 A | 3/1995 | Ginsberg | |
| D364,281 S | 11/1995 | Eason | |
| D364,516 S | 11/1995 | Helenowski | |
| 5,467,953 A | 11/1995 | Malizia | |
| 5,509,629 A | 4/1996 | Sassmannshausen et al. | |
| D370,575 S | 6/1996 | Lechleiter et al. | |
| 5,565,889 A | 10/1996 | Crooks et al. | |
| D375,639 S | 11/1996 | House et al. | |
| 5,572,237 A | 11/1996 | Crooks et al. | |
| 5,603,480 A | 2/1997 | Chen | |
| 5,732,928 A | 3/1998 | Chang | |
| D400,735 S | 11/1998 | House et al. | |
| 5,857,649 A | 1/1999 | Eason | |
| 5,894,406 A | 4/1999 | Blend et al. | |
| D409,020 S | 5/1999 | Hardin | |
| D409,594 S | 5/1999 | Lepack | |
| D414,962 S | 10/1999 | Welsh et al. | |
| D416,464 S | 11/1999 | Eason | |
| 5,979,856 A | 11/1999 | Hsu | |
| 5,984,245 A | 11/1999 | Hsu | |
| 5,996,814 A | 12/1999 | Workman et al. | |
| D421,447 S | 3/2000 | Eason | |
| 6,045,179 A | 4/2000 | Harrison | |
| D435,365 S | 12/2000 | Eason et al. | |
| 6,260,812 B1 | 7/2001 | Auke | |
| 6,283,421 B1 | 9/2001 | Eason et al. | |
| D450,339 S | 11/2001 | Eason | |
| 6,343,802 B1 | 2/2002 | Workman et al. | |
| 6,375,135 B1 | 4/2002 | Eason et al. | |
| D468,133 S | 1/2003 | Lauts | |
| D470,336 S | 2/2003 | Malizia | |
| 6,563,035 B2 | 5/2003 | Hsieh | |
| D475,555 S | 6/2003 | Lauts | |
| D481,563 S | 11/2003 | Hsieh | |
| 6,695,268 B1 | 2/2004 | Hsieh | |
| D493,363 S | 7/2004 | Eason | |
| 6,789,772 B2 | 9/2004 | Eason | |
| 6,814,332 B2 | 11/2004 | Eason | |
| D506,219 S | 6/2005 | Eason | |
| D531,750 S | 11/2006 | Lin | |
| D557,035 S | 12/2007 | Huang | |
| 7,412,069 B2 | 8/2008 | Workman et al. | |
| D576,870 S | 9/2008 | Eason et al. | |
| D580,262 S | 11/2008 | Eason et al. | |
| D582,697 S | 12/2008 | Goodman et al. | |
| D585,432 S | 1/2009 | Baker | |
| D601,817 S | 10/2009 | Barbieri | |
| 2002/0100852 A1 | 8/2002 | Eason et al. | |
| 2002/0109051 A1 | 8/2002 | Kitagawa et al. | |
| 2003/0052237 A1 | 3/2003 | Yu | |
| 2003/0178544 A1 | 9/2003 | Anderson | |
| 2004/0144233 A1 | 7/2004 | Hsieh | |
| 2005/0035247 A1 | 2/2005 | Roberts et al. | |
| 2006/0175523 A1 | 8/2006 | Tai | |
| 2006/0185495 A1 | 8/2006 | Hsieh | |
| 2008/0135697 A1 | 6/2008 | Workman et al. | |
| 2008/0229901 A1 | 9/2008 | Eason et al. | |
| 2008/0247810 A1 | 10/2008 | Eason | |

FOREIGN PATENT DOCUMENTS

| | | |
|---|---|---|
| CA | 122838 | 11/2008 |
| CA | 122837 | 6/2009 |
| CA | 126835 | 10/2009 |
| CN | 200730329517.6 | 12/2008 |
| CN | 200730329519.5 | 4/2009 |
| CN | 200730329518 | 11/2009 |
| DE | 11-2004-000-142 | 12/2005 |
| EP | 1714272 | 10/2006 |
| GB | 2412850 | 7/2007 |
| GB | 2429494 | 8/2007 |
| JP | 2007-525627 | 9/2007 |
| WO | 2004065841 | 8/2004 |
| WO | 2004066667 | 8/2004 |
| WO | 2005070132 A2 | 4/2005 |
| WO | 2005067541 A2 | 7/2005 |
| WO | 2005070123 | 8/2005 |
| WO | 2005070184 | 8/2005 |
| WO | 2006073383 A2 | 7/2006 |
| WO | 2008134653 | 11/2008 |
| WO | 2009091929 | 7/2009 |

OTHER PUBLICATIONS

Ultimate Support Systems, Inc. 1993 Product Catalog (Music Stand Edition).
Ultimate Support Systems, Inc. 1994 Product Catalog (Music Stand Edition).
Ultimate Support Systems, Inc. 1996 Product Catalog (Music Stand Edition).
Ultimate Support Systems, Inc. 1998 Product Catalog (Music Stand Edition).
Ultimate Support Systems, Inc. 1999 Product Catalog (Music Stand Edition).
Ultimate Support Systems, Inc. 2000 Product Catalog (Music Stand Edition).
Ultimate Support Systems, Inc. 2001 Product Catalog (Music Stand Edition).
Ultimate Support Systems, Inc. 2002 Product Catalog (Music Stand Edition).
Ultimate Support Systems, Inc. 2003 Product Catalog (Music Stand Edition).
Ultimate Support Systems, Inc. 2004 Product Catalog (Bicycle Stand Edition).
Ultimate Support Systems, Inc. 2004 Product Catalog (Music Stand Edition).
Ultimate Support Systems, Inc. 2005 Product Catalog (Bicycle Stand Edition).
Ultimate Support Systems, Inc. 2005 Product Catalog (Music Stand Edition).
Ultimate Support Systems, Inc. 2008 Product Catalog (Music Stand Edition).
Office Action for U.S. Appl. No. 29/294,538 dated Aug. 9, 2010.
International Preliminary Examination Report for PCT/US09/31162, Mailed Nov. 8, 2010.
Pending U.S. Appl. No. 29/286,257, filed Apr. 27, 2007.

Pending U.S. Appl. No. 29/294,538, filed Jan. 15, 2008.
Expired U.S. Appl. No. 61/144,649, filed Jan. 14, 2009.
Pending U.S. Appl. No. 12/597,905, filed Oct. 27, 2009.
Pending U.S. Appl. No. 29/230,680, filed May 24, 2005.
Expired U.S. Appl. No. 61/011,315, filed Jan. 15, 2008.

Pending Patent Application No. PCT/2009/031162, filed Jan. 15, 2009; International Search Report filed May 4, 2009; Written Opinion filed May 4, 2009.

* cited by examiner

MUSICAL SUPPORT APPARATUS

CROSS-REFERENCES TO RELATED APPLICATIONS

This international patent application claims priority to U.S. Provisional Application No. 61/011,315, filed 15 Jan. 2008, and U.S. Provisional Application No. 61/144,649, filed 14 Jan. 2009, each said provisional application incorporated herein in its entirety.

TECHNICAL FIELD

Generally, the inventive technology disclosed herein relate to item support apparatus. More particularly, certain embodiments of the inventive technology relate to musical support apparatus (e.g., support of musically related items such as musical instruments and sound speakers).

BACKGROUND ART

The desire to reliably support items has been well known for years. Particular attention has focused on the support of musical instruments, and other musical items, because of their delicate nature and vulnerability to damage, among other reasons. However, despite this attention, there still are deficiencies in existing, conventionally used designs. Such deficiencies may include, but are certainly not limited to, inefficiencies accompanying the loss of musician preferred settings (e.g., a preferred height) upon apparatus breakdown (e.g., the breakdown of a keyboard stand after a show), limited adjustability of apparatus (e.g., the limited adjustability of conventional keyboard stands), "untidy", cluttered power cables organization (or lack thereof), unnecessarily high risk of item damage during use thereof (e.g., keyboard slippage off a support), unnecessary complexity of design (e.g., as seen in conventional guitar stands featuring retainers on a support yoke), stands (e.g., microphone stands) of sub-optimal strength, unable to support a downward weight applied by, e.g., a gesturing singer, and a complete absence of any apparatus that assist in and seek to facilitate the awkward and difficult raising or lowering of stand supported speakers. Indeed, embodiments of the inventive technology seek to resolve, or at least mitigate, one or more of these problems.

DISCLOSURE OF INVENTION

It is an object of at least one embodiment of the inventive technology to eliminate or, at least reduce the inefficiencies accompanying the loss of musician preferred settings (e.g., a preferred height) upon breakdown (e.g., the breakdown of a keyboard stand after a show) of conventional apparatus.

It is an object of at least one embodiment of the inventive technology to provide a more adjustable keyboard support stand.

It is an object of at least one embodiment of the inventive technology to provide a more aesthetic, less cluttered organization of power cables that power keyboards being supported by keyboard stands.

It is an object of at least one embodiment of the inventive technology to abate the unnecessarily high risk of item damage during use thereof (e.g., keyboard slippage off a support).

It is an object of at least one embodiment of the inventive technology to offer a simple, more robust, guitar stand design (as compared with conventional guitar stands featuring retainers on a support yoke).

It is an object of at least one embodiment of the inventive technology to offer an apparatus that locks the relative position of one tube of a nested (telescoping) tube system with a strength that is greater than prior designs.

It is an object of at least one embodiment of the inventive technology to provide an apparatus that assists in and seeks to facilitate the awkward and difficult raising or lowering of stand supported speakers.

Of course other advantages and goals of the various inventive technology disclosed herein may be mentioned, either explicitly or inherently, in the following description and the figures. It is also of note that the figures disclosed herein include not only the figures filed the day of this international application filing, but also those figures of the two provisional applications that this application claims priority to, as both such provisional applications, including all the drawings filed therein, are incorporated into this filing.

MODES FOR CARRYING OUT THE INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
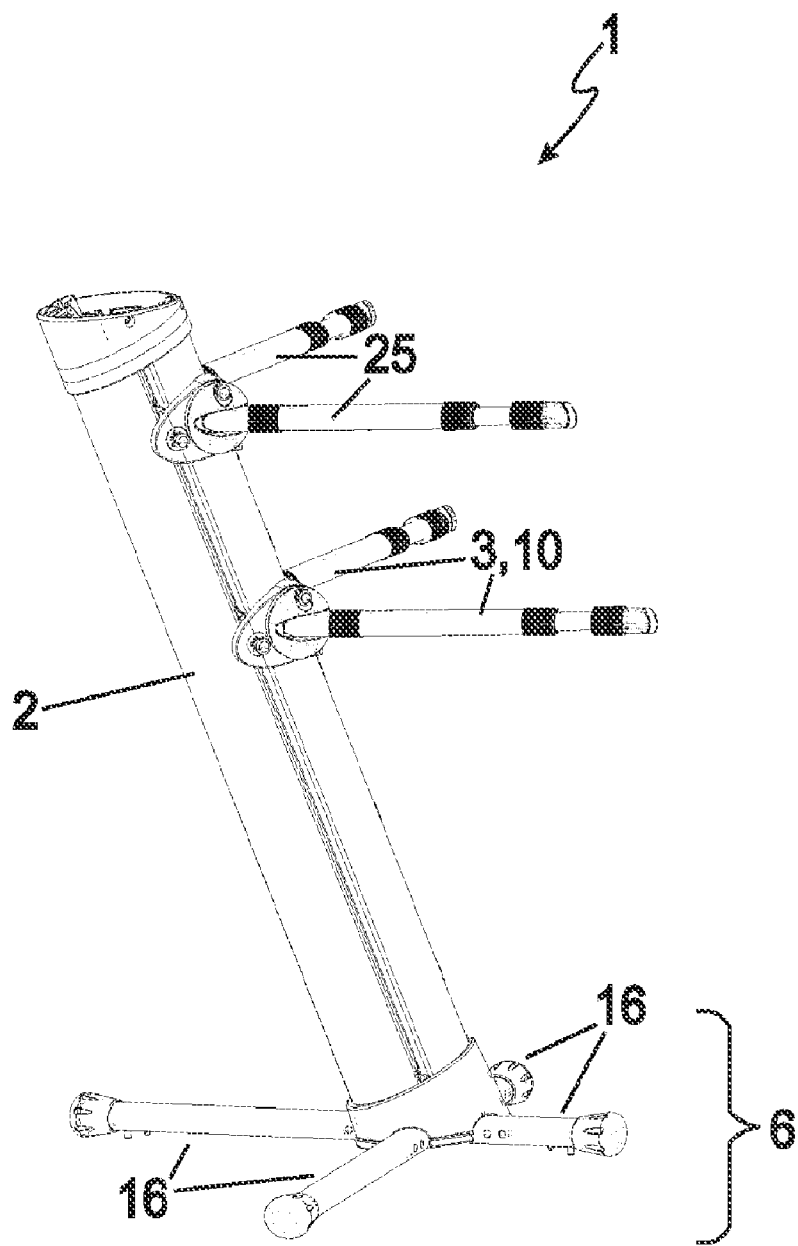
FIG. 1 shows a perspective view of an embodiment of the inventive keyboard stand apparatus in support mode.
Figure 2:
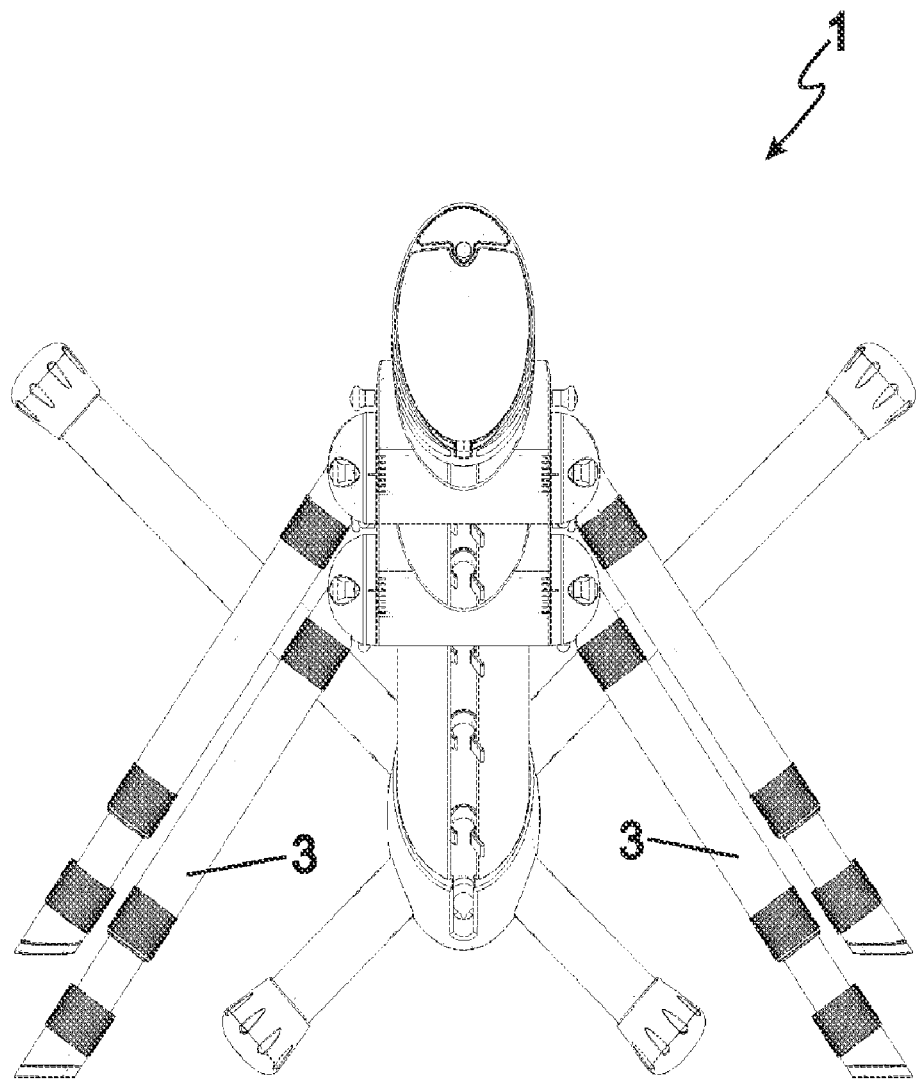
FIG. 2 shows a top view of an embodiment of the inventive keyboard stand apparatus in support mode.

At least one embodiment of the inventive technology may be described as a keyboard stand apparatus 1 that comprises: an upright rear support 2; two keyboard supports 3 that, when the apparatus is in a support configuration (see, e.g., FIG. 1), are established forward of the upright rear support (a keyboardist plays forward of the stand apparatus) and define a keyboard support surface 4 having an angle 5 relative to horizontal; and a support base 6 established to support the upright rear support when the apparatus is in a support configuration, where the keyboard supports are angularly adjustable so that the aforementioned angle is adjustable, and where upright rear support proximal ends 7 of the two keyboard supports (ends of such supports that are nearest, as opposed to distal, the upright rear support) are height adjustable. It is of note that the keyboard support surface is the part of the supports that may contact the keyboard during support thereof. Also, the keyboard support surface is viewed as having an angle relative to horizontal even if such angle is zero. In certain two tiered embodiments, the two keyboard supports are two lower keyboard supports 10, the keyboard support surface is a lower keyboard support surface 11, the angle relative to horizontal is a first angle 12 relative to horizontal, and the apparatus further comprises two upper keyboard supports 25 that, when the apparatus is in the support configuration, are established forward of the upright rear support, above the two lower keyboard supports and define an upper keyboard support surface 26 having a second angle 14 relative to horizontal. The upright rear support proximal ends 7 of the two upper keyboard supports may be height adjustable (or course, so may the lower supports, as mentioned above), the keyboard supports may be angularly adjustable so that the first angle and the second angle are adjustable, and/or each of the keyboard supports may be length adjustable (e.g., by telescoping tubes, perhaps with a button lock). As in any embodiment, the support base may comprise feet 16. Angle adjustment allows keyboard players to play keyboard(s) at their preferred angle; such angle relative to the horizontal may be measured in a vertical plane that is orthogonal to the long axis of the keyboard(s).

Figure 15:
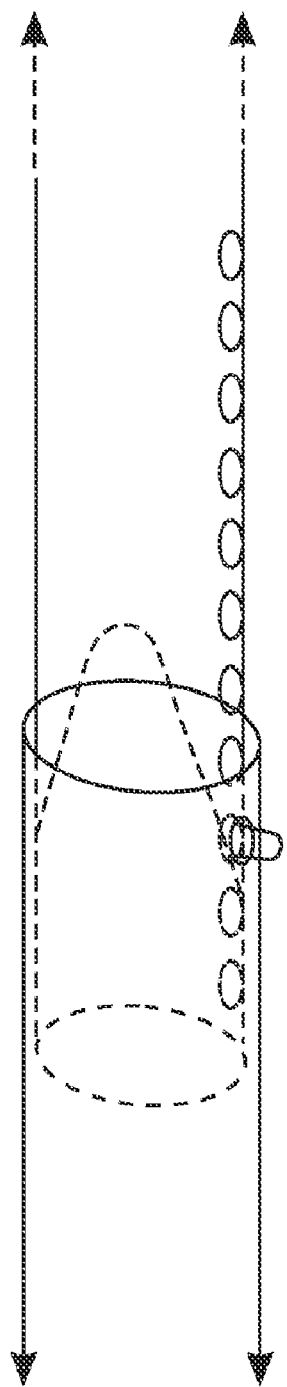
FIG. 15 shows the support length adjustment system as found in at least one embodiment of the inventive keyboard stand apparatus.

Adjustment of such angles may be accomplished in any of several known ways, including but not limited to spring-loaded pin and hole systems 17 (where there may be one pin 18 for each support (or for both supports of a single tier) and a plurality of holes 19 around a circular arc, each defining a different angle and into which such pin may be inserted to lock in an operator preferred angle). Length adjustability may be afforded by any of several methods, including but not limited to spring-loaded pin/hole systems (where each of a plurality of holes are associated with a different support length; see FIG. 15). In certain embodiments, height adjustability may be achieved via an upright column 20 with a plurality of holes 22, and at least one spring-loaded pin 21 for each tier, such pin(s) insertable into the selected hole(s) to achieve a desired height for a support tier. As used herein, the term upright does not require vertical; it merely requires a vertical component.

At least one embodiment of the inventive technology may be described as a keyboard stand apparatus 1 that comprises: an upright rear support 2; two keyboard supports 3 that, when the apparatus is in a support configuration, are established forward of the upright rear support and define a keyboard support surface 4 having an angle relative to horizontal; and a support base 6 established to support the upright rear support when the apparatus is in a support configuration, where each of the keyboard supports are length adjustable. In certain two tiered embodiments, the two keyboard supports are two lower keyboard supports 10, the keyboard support surface is a lower keyboard support surface 11, and the angle relative to horizontal is a first angle 12 relative to horizontal, and the apparatus may further comprise two upper keyboard supports 25 that, when the apparatus is in the support configuration, are established forward of the upright rear support, above the two lower keyboard supports and define an upper keyboard support surface 26 having a second angle 14 relative to horizontal. The keyboard supports may be angularly adjustable so that the first angle and/or the second angle are adjustable, the upright rear support proximal ends 7 of any of the keyboard supports may be height adjustable, and/or the upright rear support proximal ends of the two upper keyboard supports may be height adjustable.

Figure 3:
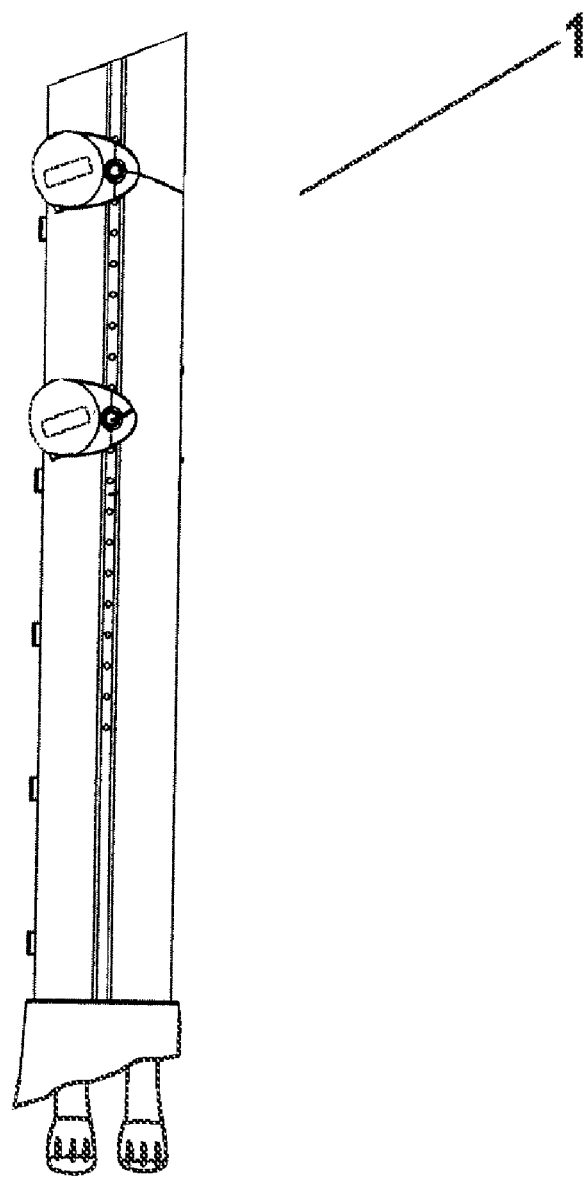
FIG. 3 shows a side view of an embodiment of the inventive keyboard stand apparatus in storage mode.
Figure 4:
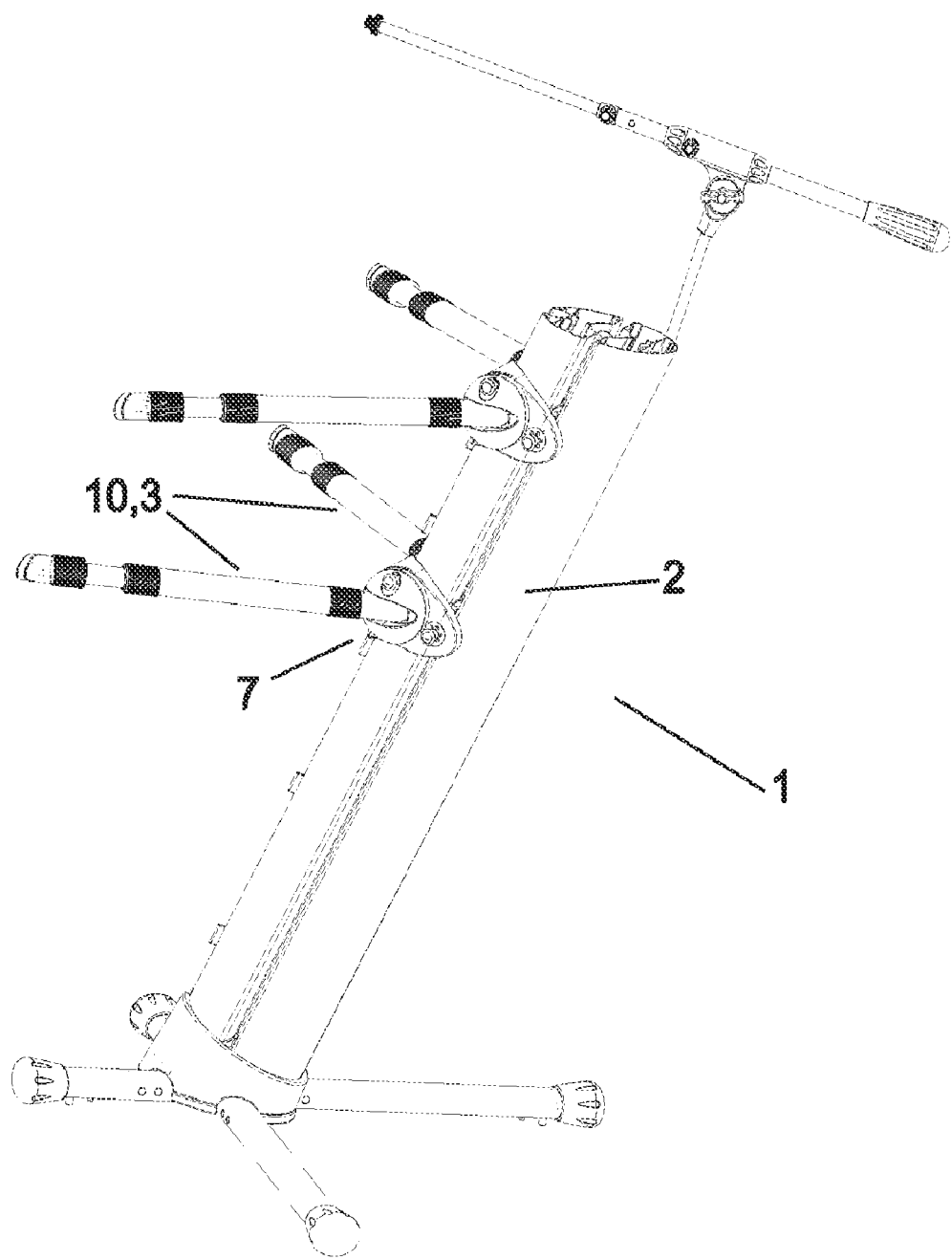
FIG. 4 shows a perspective view of an embodiment of the inventive keyboard stand apparatus in support mode, with microphone boom.
Figure 5:
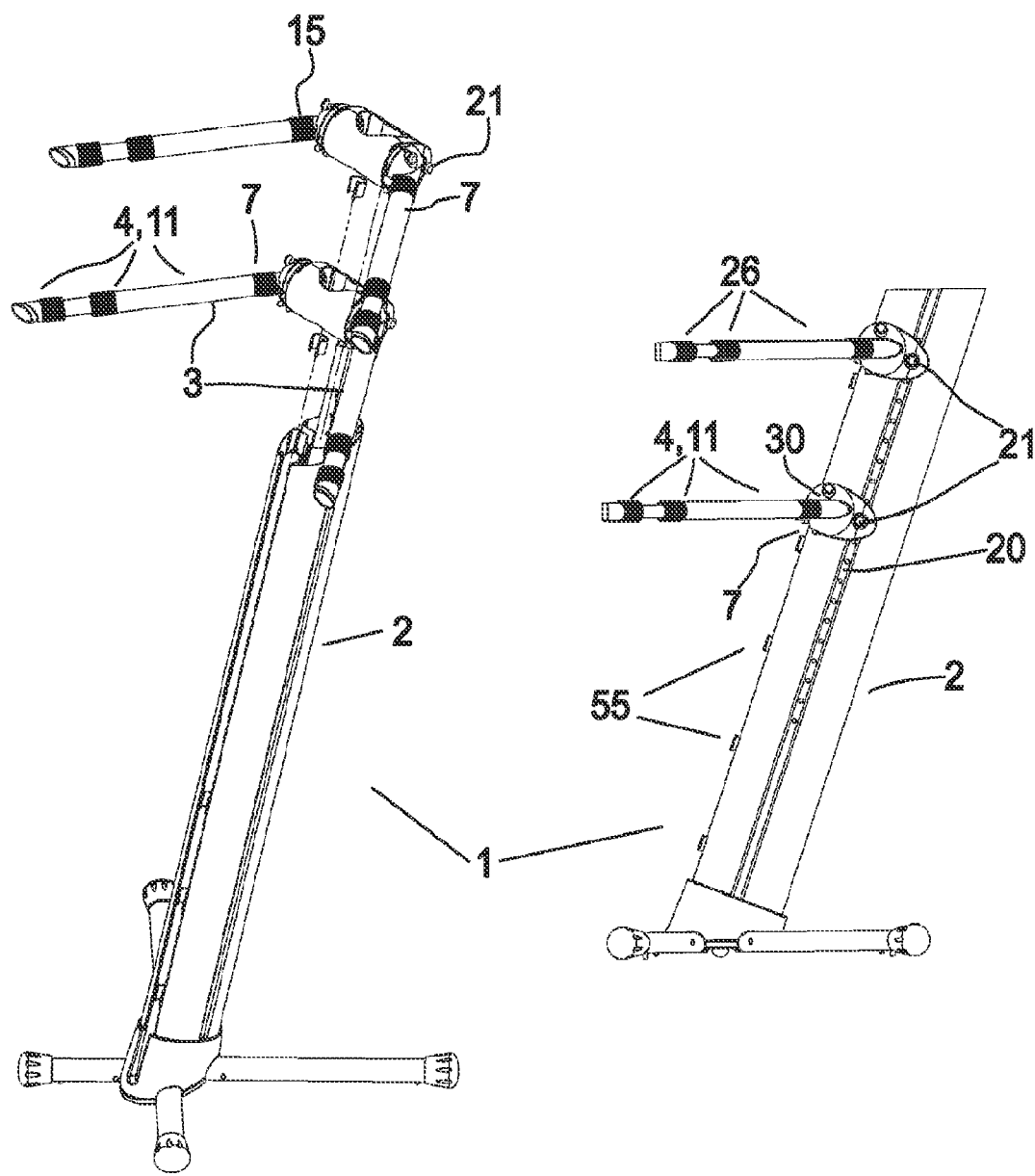
FIG. 5 shows perspective and side views of embodiment of the inventive keyboard stand apparatus in support mode.

At least one embodiment of the inventive technology may be described as a keyboard stand apparatus 1 that is reconfigurable from a support mode (see FIG. 1) to a storage mode (see FIG. 3), the apparatus comprising: an upright rear support 2; two keyboard supports 3 that, when the apparatus is in a support configuration, are established forward of the upright rear support and define a keyboard support surface 4 having an angle 5 relative to horizontal; and a support base 6 established to support the upright rear support when the apparatus is in a support configuration, where the keyboard supports are angularly adjustable so that the angle is adjustable to an operator preferred angle (i.e., that angle preferred by a keyboardist), where upright rear support proximal ends 7 of the two keyboard supports are height adjustable to an operator preferred support height, where settings for each the operator preferred angle, and the operator preferred support height are automatically retainable from a first support mode through a subsequent storage mode to a later support mode. In certain two tiered embodiments, the two keyboard supports are two lower keyboard supports 10, the keyboard support surface is a lower keyboard support surface 11, and the angle relative to horizontal is a first angle 12 relative to horizontal, and the apparatus further comprises two upper keyboard supports 25 that, when the apparatus is in the support configuration, are established forward of the upright rear support, above the two lower keyboard supports and define an upper keyboard support surface 26 having a second angle 14 relative to horizontal. In certain embodiments, the keyboard supports are angularly adjustable so that the first angle and/or the second angle are adjustable to operator preferred first and/or second angles. In certain embodiments, settings for each the operator preferred angles and the operator preferred support heights are automatically retainable from a first support mode (e.g., as seen in a first show or gig in a first town) through a subsequent storage mode (as seen during subsequent transport to a second town, or merely nonuse) to a later support mode (as seen in a second, later, show, perhaps in a second town). In certain embodiments, each of the keyboard supports are adjustable to operator preferred lengths. Indeed, the setting for each the operator preferred lengths may be automatically retainable from the first support mode through the subsequent storage mode to the later support mode (it is of note that upon "memorizing" (or automatically retained) such lengths, width between midpoints of the supports may also be "memorized"). By automatically retainable is meant that no proactive action dedicated exclusively to "setting memorization" is required to assure such setting memorization or retention; merely following after-show break down procedures and subsequent setup procedures will "automatically" result in retention or memorization of the settings characteristic of the apparatus during setup at the previous show. It is of note, incidentally, that the feet of the apparatus may be either removed and stored inside the upright rear support (or a bag, possibly), or folded (e.g., down) and stored within the upright rear support. Additional embodiments may involve a microphone boom that may extend from the upright rear support, or be stowed therein, as desired. Such boom may be length adjustable.

Figure 6:
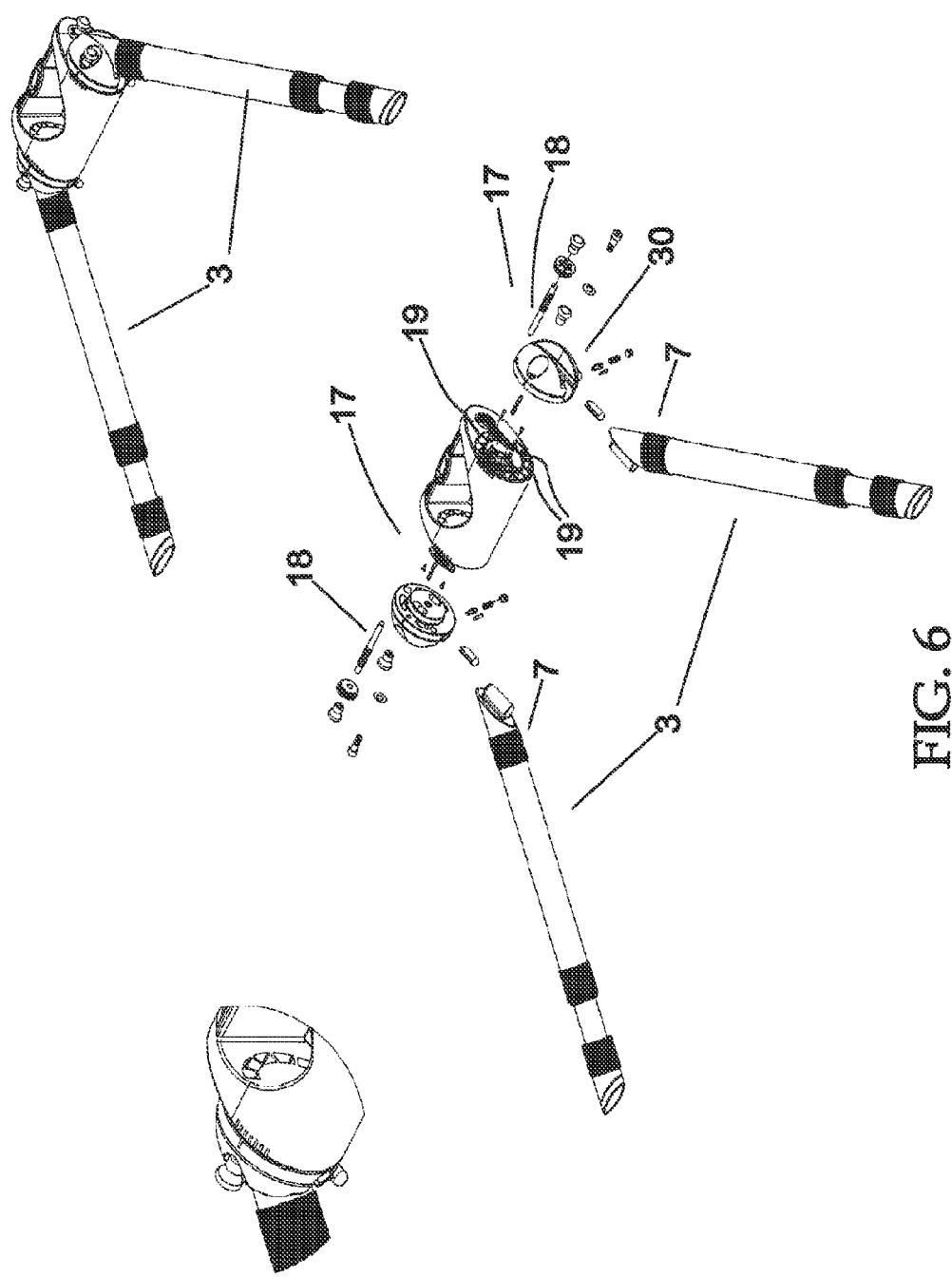
FIG. 6 shows an exploded view of components of the inventive keyboard stand apparatus in support mode.
Figure 7:
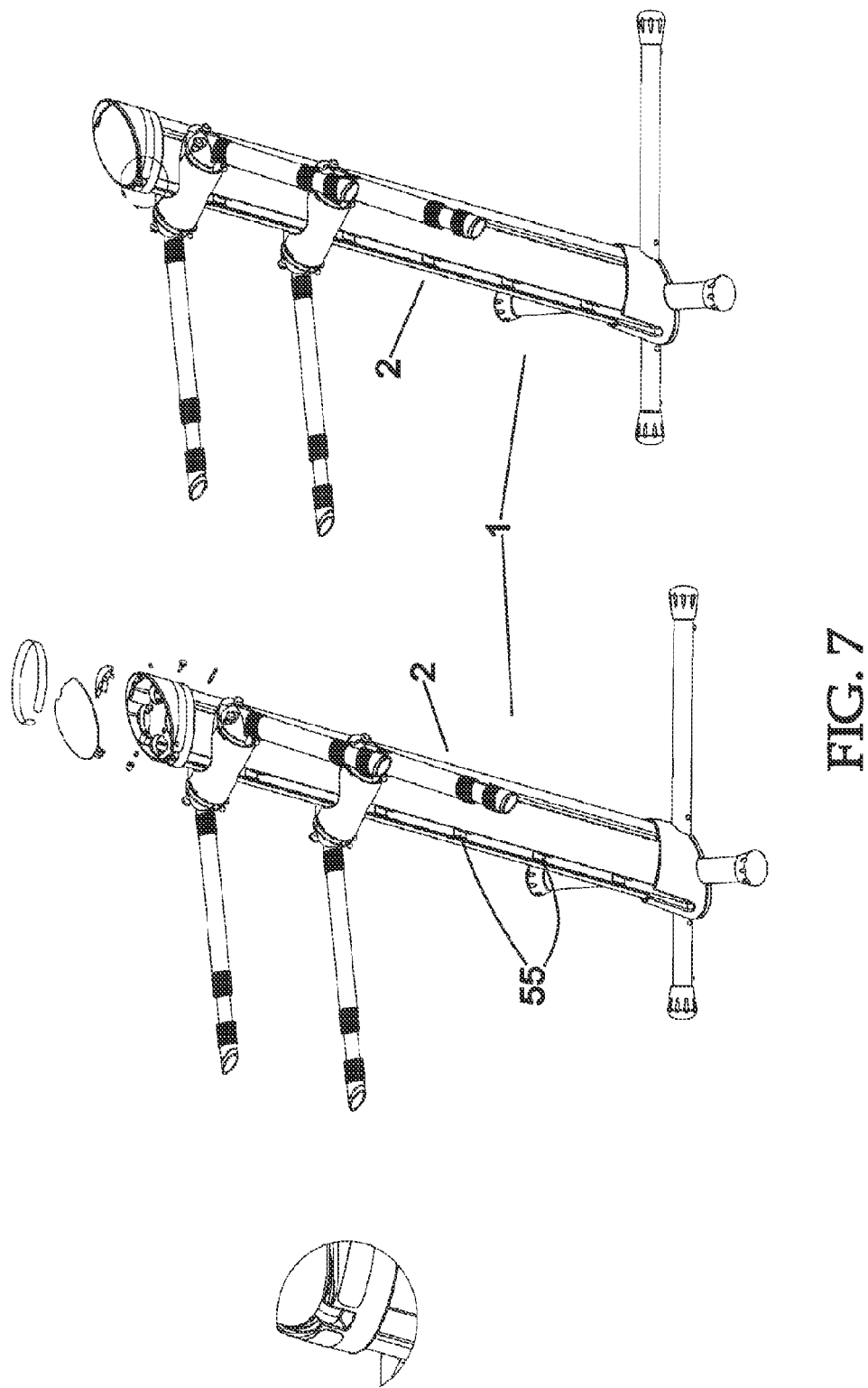
FIG. 7 show perspective views of an embodiment of the inventive keyboard stand apparatus in support mode.
Figure 8:
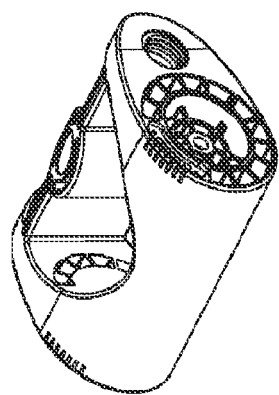
FIG. 8 shows views of the housing of the support attachment module of an embodiment t of the inventive keyboard stand apparatus.
Figure 8:
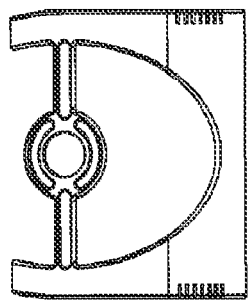
Figure 8:
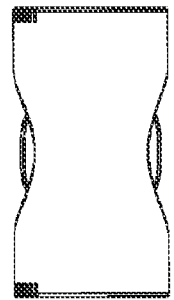
Figure 8:
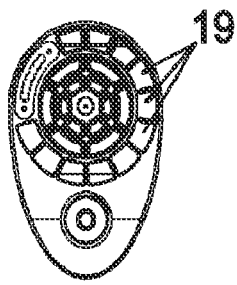
Figure 9:
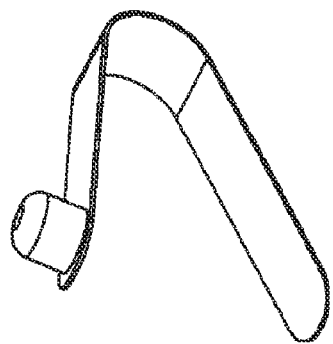
FIG. 9 shows views of a biased snap button that may find use in the adjustment of the telescoping tubes of the supports of an embodiment of the inventive keyboard stand apparatus.
Figure 9:
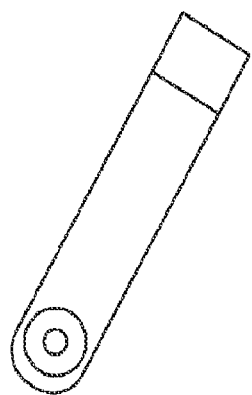
Figure 9:
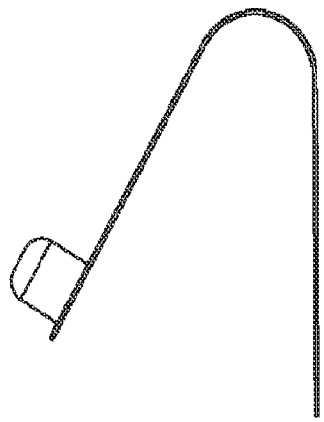
Figure 9:
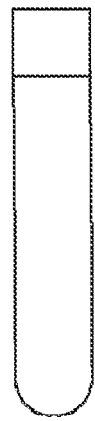
Figure 10:
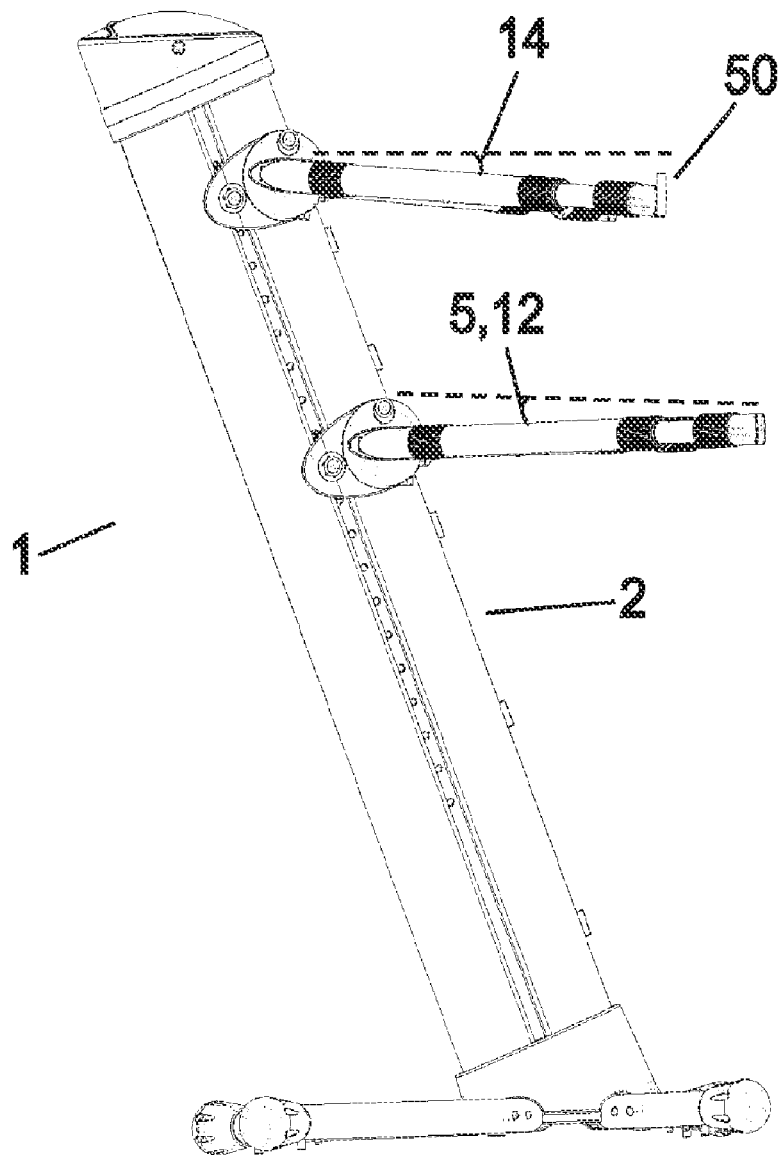
FIG. 10 shows a side view of an embodiment of the inventive keyboard stand apparatus in support mode, showing non-zero angles of support surfaces.
Figure 11:
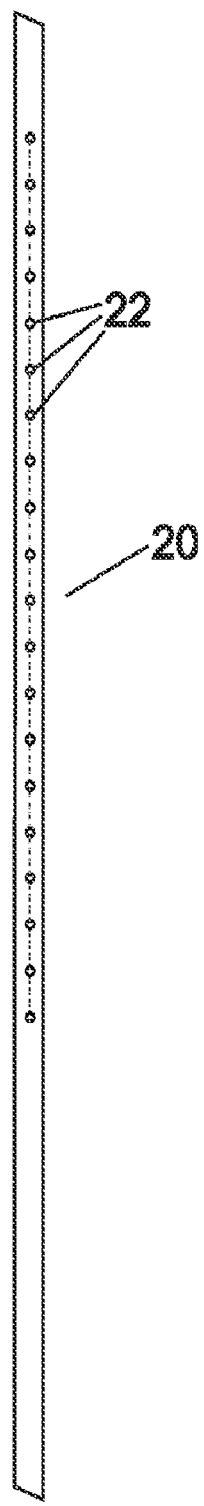
FIG. 11 shows an upright column that is a component of the support adjustment system found in embodiments of the inventive keyboard stand apparatus.

Automatic height setting retention may be achieved by enabling a support snap-in feature, where the support snaps into a support attachment module 30 that itself is height adjustable and that, because of its small size, need not be removed during apparatus break down. As such, it, and the height at which it is set (via, e.g., a spring loaded pin/hole system) are retained at their support configuration setting (as is seen when a keyboardist is playing). Automatic support angle setting retention is achieved also by enabling a support snap-in feature (see, e.g., FIG. 6), where the support snaps into a support attachment module at the only possible snap-in position, which is at the operator preferred support angle. Again, this support attachment module, because of its small size, need not be removed during apparatus break down. As such, it, and the support angle at which it is set (via, e.g., a spring loaded pin/hole system) are retained at their support configuration setting (as is seen when a keyboardist is playing). Automatic support length setting retention is achieved by a preferred length lock feature (a spring loaded pin and hole feature, as but one example; see FIG. 15), and removability and storage of such supports at their preferred lengths. Storage may be achieved in the upright support, or simply in the storage bag. Of course, such comprehensive automatic retention feature enables quicker setup, particularly when the same keyboardist will play after breakdown and storage of the apparatus. Band regulars (e.g., "roadies"), who set up the show truly appreciate such comprehensive automatic setting retention feature. So do, for obvious reasons, the musicians.

At least one embodiment of the inventive technology may be described as a keyboard stand apparatus 1 reconfigurable from a support mode to a storage mode, the apparatus comprising: an upright rear support 2; two keyboard supports 3 that, when the apparatus is in a support configuration, are established forward of the upright rear support and define a keyboard support surface 4 having an angle 5 relative to horizontal; and a support base 6 established to support the upright rear support when the apparatus is in a support configuration, where upright rear support proximal ends 7 of the two keyboard supports are height adjustable to an operator preferred support height, where each of the keyboard supports are adjustable to operator preferred lengths, and where settings for each the operator preferred support height, and the operator preferred lengths are automatically retainable from a first support mode through a subsequent storage mode to a later support mode. In certain embodiments, the two keyboard supports are two lower keyboard supports 10, the keyboard support surface is a lower keyboard support surface 11, and the angle relative to horizontal is a first angle 12 relative to horizontal, and the apparatus may further comprise two upper keyboard supports 25 that, when the apparatus is in the support configuration, are established forward of the upright rear support, above the two lower keyboard supports and define an upper keyboard support surface 26 having a second angle 14 relative to horizontal. Further, each of the keyboard supports may be adjustable to operator preferred lengths, and upright rear support proximal ends of the any of the keyboard supports may be height adjustable to an operator preferred support height (e.g., an upper support height and/or a lower support height). Also, keyboard supports may be angularly adjustable so that the first angle and the second angle are adjustable to operator preferred angles.

At least one embodiment of the inventive technology may be described as a keyboard stand apparatus 1 that comprises an upright rear support 2; two keyboard supports 3 that, when the apparatus is in a support configuration, are established forward of the upright rear support and define a keyboard support surface 4 having an angle 5 relative to horizontal; and a support base 6 established to support the upright rear support when the apparatus is in a support configuration, where upright rear support proximal ends 7 of the two keyboard supports are height adjustable, the apparatus further comprising: a support height column 20 established above the support base; a plurality of holes 22 disposed along the support height column (e.g., the axis thereof); and at least one hole insertable parts 21, each associated with at least one of the keyboard supports (hole insertable parts include parts such as pins, e.g., that can be inserted at least partially in such hole so as to prevent an undesired weight induced motion of the supports and perhaps a keyboard thereon); the at least one hole insertable parts may be insertable into a selected hole corresponding to a operator preferred support height. In certain two tiered embodiments the two keyboard supports are two lower keyboard supports 10, the keyboard support surface is a lower keyboard support surface 11, and the angle relative to horizontal is a first angle relative to horizontal, and the apparatus further comprises two upper keyboard supports 25 that, when the apparatus is in the support configuration, are established forward of the upright rear support, above the two lower keyboard supports and define an upper keyboard support surface 26 having a second angle 14 relative to horizontal. In certain two tiered embodiments, the at least one hole insertable parts 21 are insertable into selected holes corresponding to a operator preferred lower support height and an operator preferred upper support height. The plurality of holes may be through-holes and/or have axes that are horizontal. Each of the at least two hole insertable parts may be biased towards the support height column (e.g., when they are spring loaded).

Figure 12:
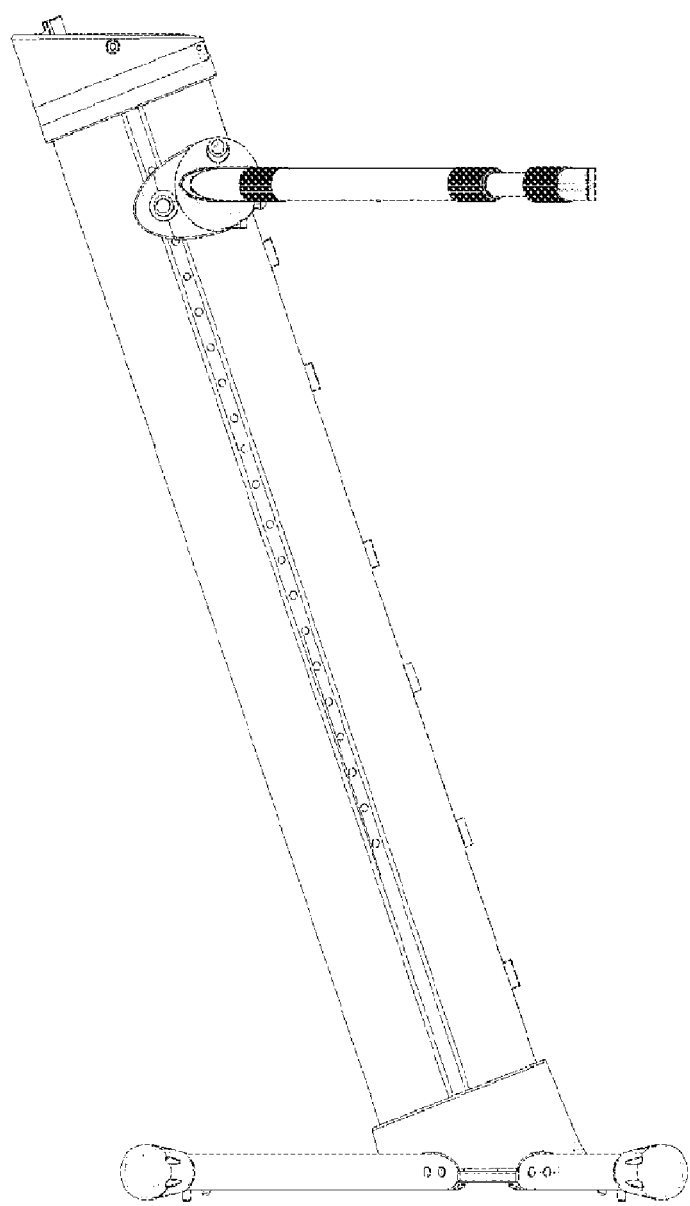
FIG. 12 shows a side view of an embodiment (a one support tier embodiment) of the inventive keyboard stand apparatus in support mode.
Figure 13:
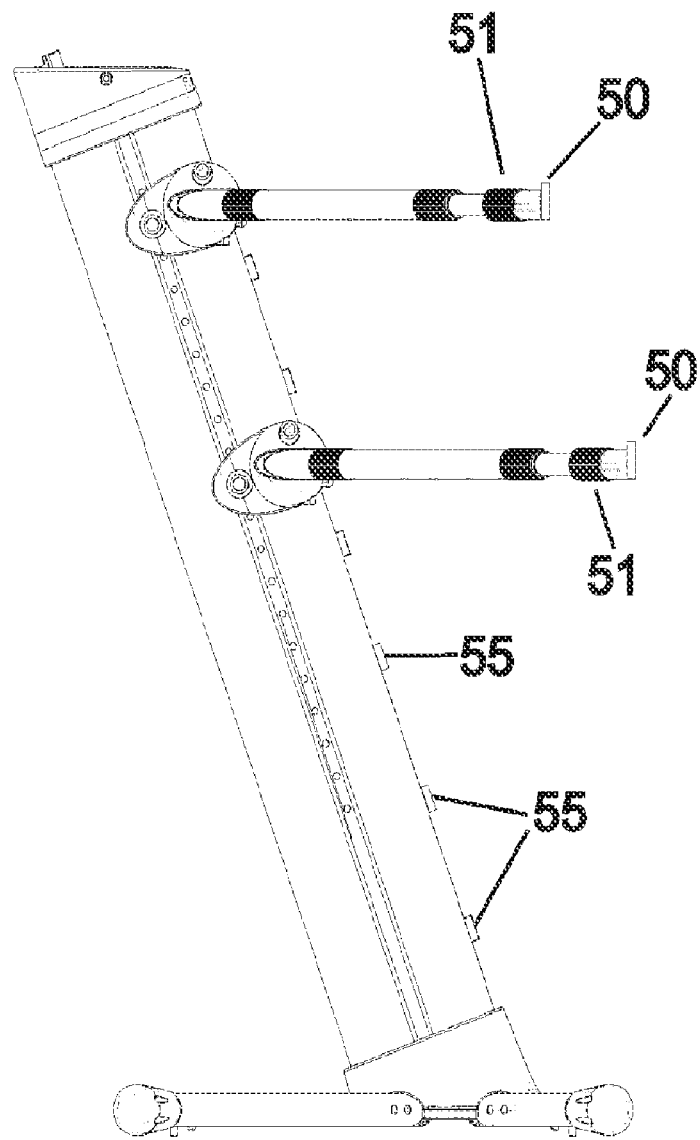
FIG. 13 shows a side view of an embodiment of the inventive keyboard stand apparatus in support mode.
Figure 14:
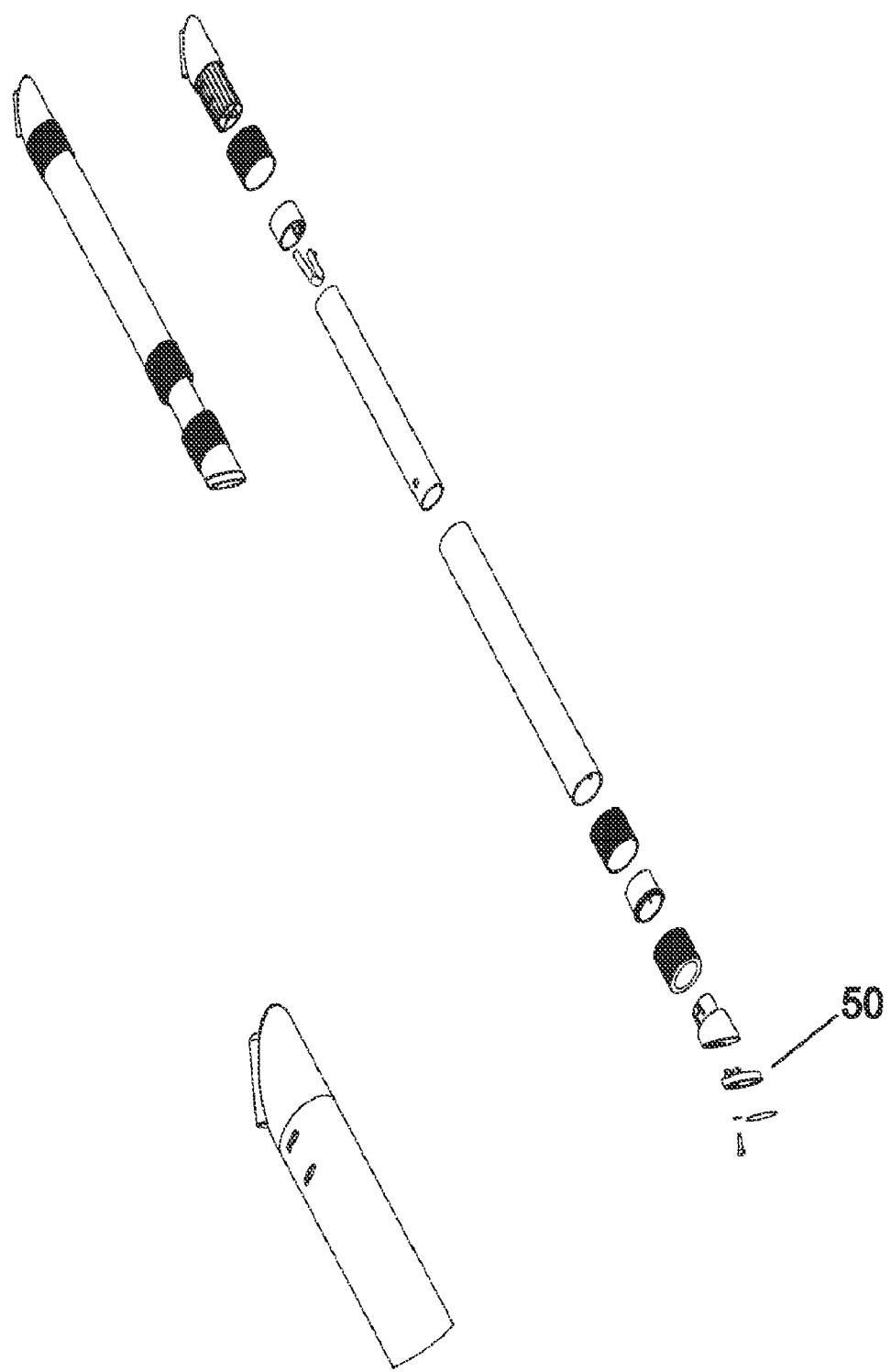
FIG. 14 shows a support view, in exploded and other view, as found in at least one embodiment of the inventive keyboard stand apparatus.
Figure 16:
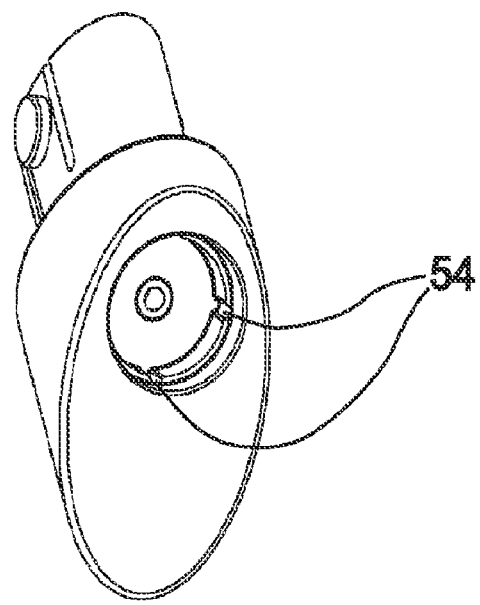
FIG. 16 shows components of the support arms onto which may be secured end stops, in at least one embodiment of the inventive keyboard stand apparatus.
Figure 16:
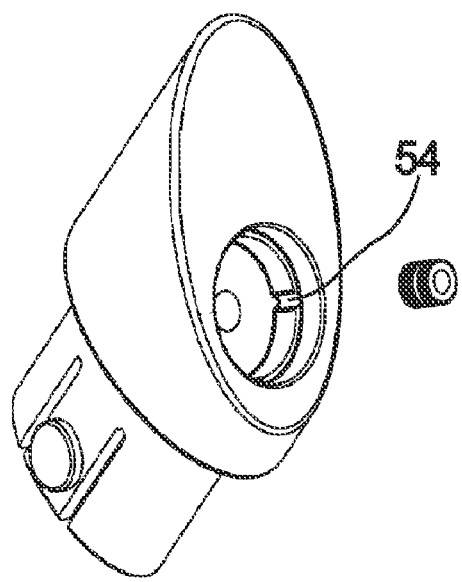
Figure 17:
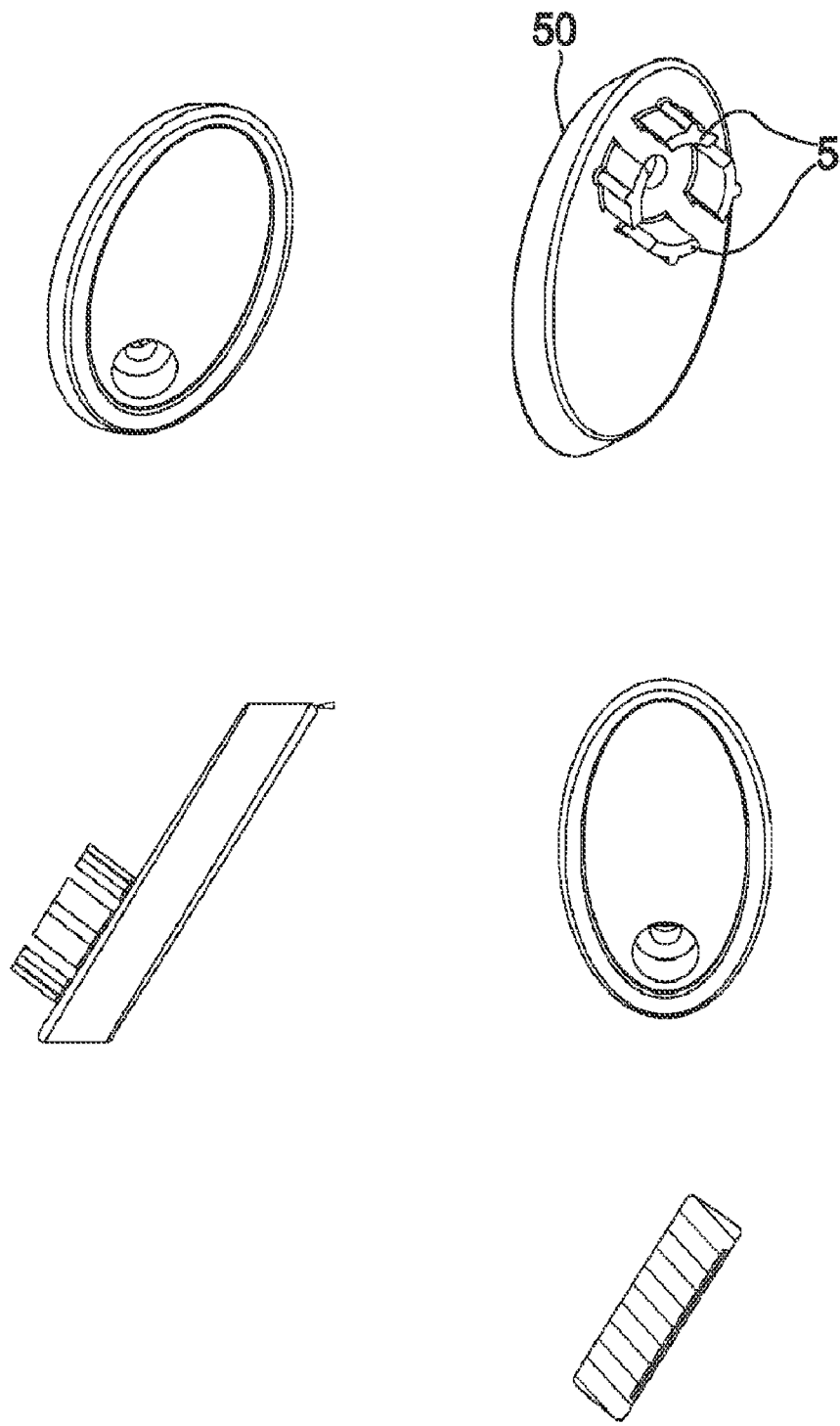
FIG. 17 shows ends stops that may be found at the end of support arms in at least one embodiment of the inventive keyboard stand apparatus.
Figure 18:
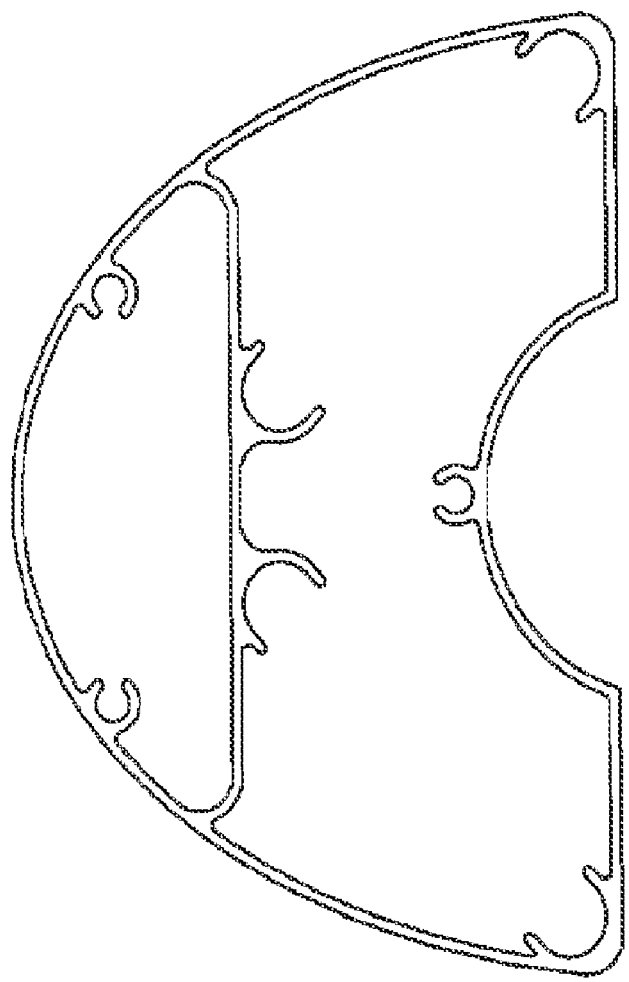
FIG. 18 shows an axial cross-section of the outer shell of the upright rear support of at least one embodiment of the inventive keyboard stand apparatus.
Figure 19:
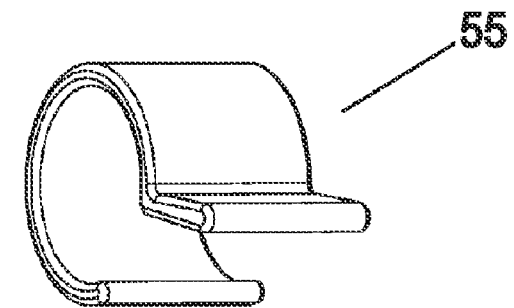
FIG. 19 shows views of a cable retainer that may be found in at least one embodiment of the inventive keyboard stand apparatus.
Figure 19:
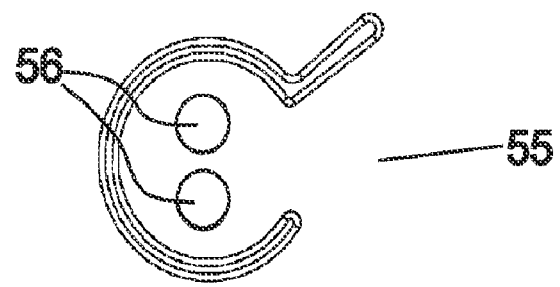
Figure 19:
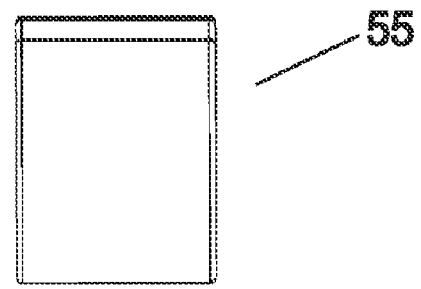

At least one embodiment of the inventive technology may be described as a keyboard stand apparatus 1 and comprise: an upright rear support 2; two keyboard supports 3 that, when the apparatus is in a support configuration, are established forward of the upright rear support and define a keyboard support surface 4 having an angle 5 relative to horizontal; a support base 6 established to support the upright rear support when the apparatus is in a support configuration; and manually pivotable end stops 50, each established at an upright rear support distal end 51 of a different one of the keyboard supports. In certain embodiments, the upright rear support proximal ends 7 of the two keyboard supports are height adjustable, each of the manually pivotable end stops are manually pivotable between a keyboard obstruction mode (so as to prevent undesired slippage of a supported keyboard by protruding above a support surface; see FIG. 13) and non-obstruction mode (as is seen where the stops are not protruding above a support surface; see FIG. 12). In certain embodiments, the two keyboard supports are two lower keyboard supports 10, the keyboard support surface is a lower keyboard support surface 11, and the angle relative to horizontal is a first angle 12 relative to horizontal, and further comprising two upper keyboard supports 25 that, when the apparatus is in the support configuration, are established forward of the upright rear support, above the two lower keyboard supports and define an upper keyboard support surface 26 having a second angle 14 relative to horizontal. Preferably, all support arms have manually pivotable end stops at their upright rear support distal end 51. In certain embodiments, the upright rear support proximal ends of the two upper keyboard supports are height adjustable, and the manually pivotable end stops are each established at an upright rear support distal end of a different one of the upper keyboard supports. The stops may pivot between at least two rotation lock positions (one being a full obstruct position, where the greatest obstruction possible, given the configuration of the stop, is provided), another being the non-obstruction position. Certain designs (as shown in FIGS. 16 and 17) may incorporate additional rotation lock positions (e.g., which are each 90 degrees apart). Regardless, reconfiguration of the stops into each such lock position, and retention in such positions, may be facilitated by biased parts 53 that spring lock into indentations 54 when their protrusions align with such indentations. In FIGS. 16 and 17, the biased parts are radially internal of the indented ring; such parts are biased outwardly. Further, each of the keyboard supports may be adjustable to operator preferred lengths.

Figure 20:
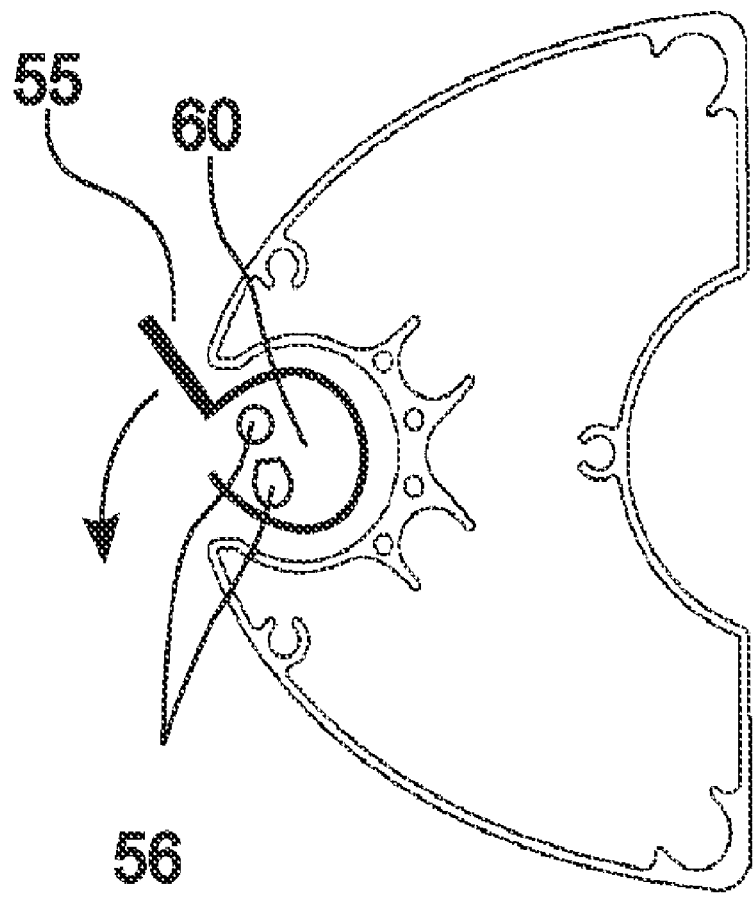
FIG. 20 shows an axial cross-section of the outer shell of the upright rear support of at least one embodiment of the inventive keyboard stand apparatus

At least one embodiment of the inventive technology may be described as a keyboard stand apparatus 1 and comprise an upright rear support 2; two keyboard supports 3 that, when the apparatus is in a support configuration, are established forward of the upright rear support and define a keyboard support surface 4 having an angle 5 relative to horizontal; a support base established to support the upright rear support when the apparatus is in a support configuration; and at least one power cable retainer 55 that is operable to hold electrical power cables 56 to the upright rear support during keyboard use, where upright rear support proximal ends 7 of the two keyboard supports are height adjustable. In particular embodiments, the at least one power cable retainer is operable to hold electrical power cables inside of an outer surface of the upright rear support during keyboard use. Further, each of the at least one power cable retainer may be established substantially at a front of the upright rear support, perhaps in cavity 60 (in horizontal cross-section). Each of the at least one power cable retainer may be rotatable (e.g., about an axis that is parallel to a longitudinal axis of the upright rear support) from a cable reception mode (see FIG. 20) to a cable retention mode. Retainers may be retained in position via an outward spring force that frictionally secures them in a cavity, where such outward force may be achieved by sizing the retainer "large" for such cavity; downward migration during use may be precluded by stops in the cavity (e.g., a screw or pin protruding from an inner wall), or intervening tubes (that maintain the position of retainers by filling in the gaps between them, thereby obstructing weight induced motion). In particular embodiments, the two keyboard supports are two lower keyboard supports 10, the keyboard support surface is a lower keyboard support surface, and the angle relative to horizontal is a first angle 12 relative to horizontal, and the apparatus further comprises two upper keyboard supports 25 that, when the apparatus is in the support configuration, are established forward of the upright rear support, above the two lower keyboard supports and define an upper keyboard support surface 26 having a second angle 14 relative to horizontal. Further, upright rear support proximal ends 7 of the two upper keyboard supports may be height adjustable.

It is of note that the above described apparatus may, instead of being merely a keyboard stand apparatus, be more generally described as an item stand apparatus. Perhaps it could be used with laptops, as but one additional example. Indeed, the term keyboard of the above can be replaced with the term "item."

At least one embodiment of the inventive technology may be described as a sound speaker support apparatus 60 comprising: a support base 61; a lower vertical support member 62 fixed to the support base; an upper vertical support member 63 established substantially above said lower vertical support member when said apparatus is in a support mode (perhaps the two members are telescoping tubes); an elevated speaker support 64 established above the upper vertical support member; an upwardly biased spring 65 established so as to provide an elevating force to the elevated speaker support; and a speaker stand height locker 66 (e.g., a well-known system whereby a rotatable knob is rotatable to effect a "pinch" that retains a larger tube in fixed position relative to a smaller tube nested therein) established so as to enable locking of the elevated speaker support at a desired height. In particular embodiments, the upwardly biased spring is established within at least one of the vertical support members, and may be either a pneumatic spring, a helical spring, a hydraulic spring, or a gas spring, as but a few examples. In certain designs, the elevating force is less than the weight of a speaker for which the apparatus is intended, so that during elevation, the speaker will not raise uncontrollably (i.e., an operator, with a small manual force, can easily raise the supported speaker with a manual elevating force that is only a fraction of the weight of the speaker). In certain embodiments, the elevating force is greater than 50 per-cent the weight of the speaker; it may be greater than 75 per-cent the weight of the speaker, as but two examples. It is of note that, as mentioned, in a preferred embodiment, the apparatus is intended for use with speakers that are heavier than the elevating force effected by the apparatus when it is released and allowed to exert the spring's upward elevating force. The intended speaker will typically have a weight such that, upon application of the apparatus' elevating force, a person can easily and controllably raise the speaker to the desired height; at times, a lowering of a supported speaker may be desired, and the weight of a speaker for which the apparatus is intended will not be so great that the speaker lowers too fast or such that a user cannot control it easily. To further facilitate control, the speaker stand height locker may be operable to provide a gradual application of the elevating force upon release of the stand height locker (as may be afforded by a rotatable knob type locker as described above).

Figure 21:
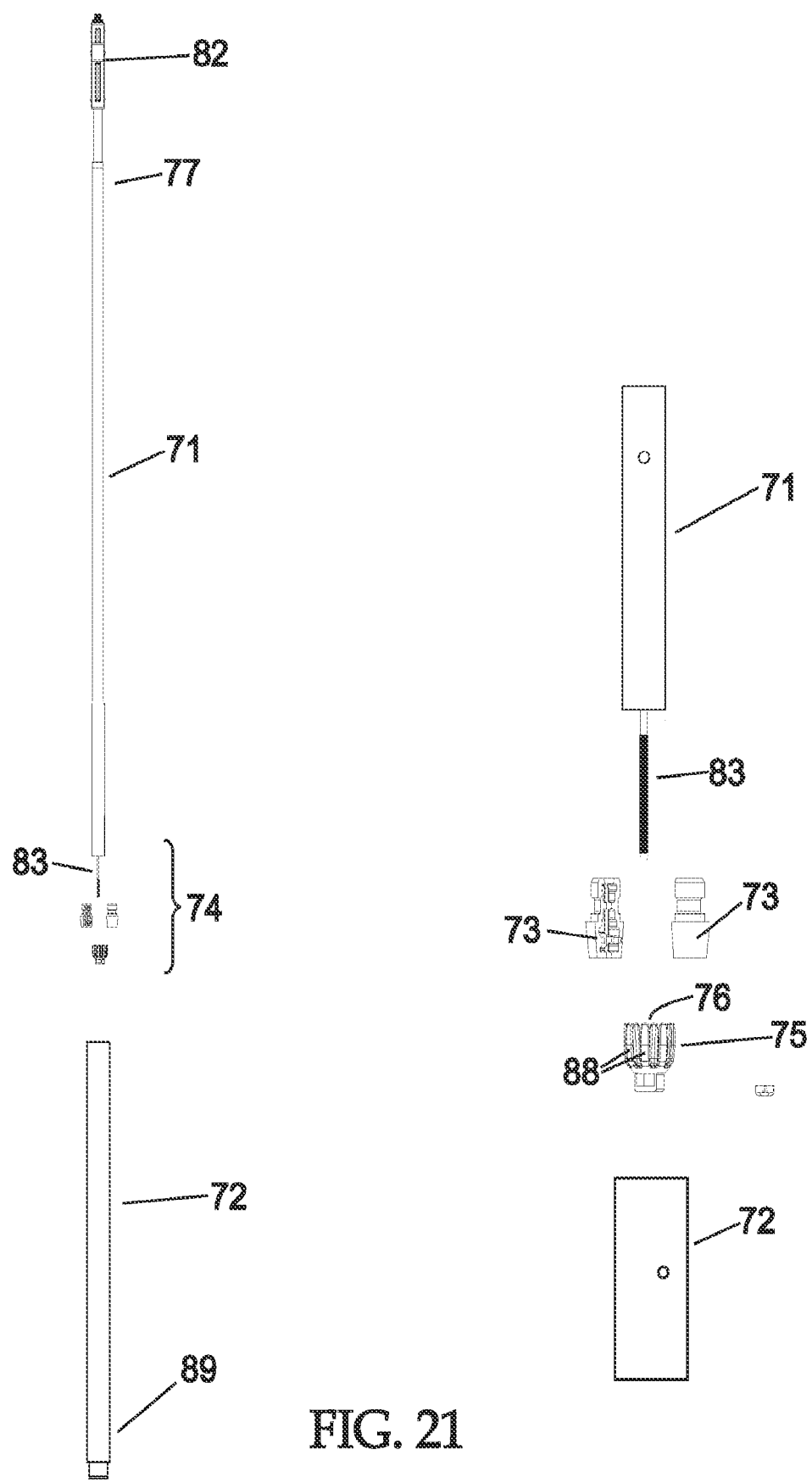
FIG. 21 shows exploded views of an embodiment of the inventive telescoping tube position lock apparatus.
Figure 22:
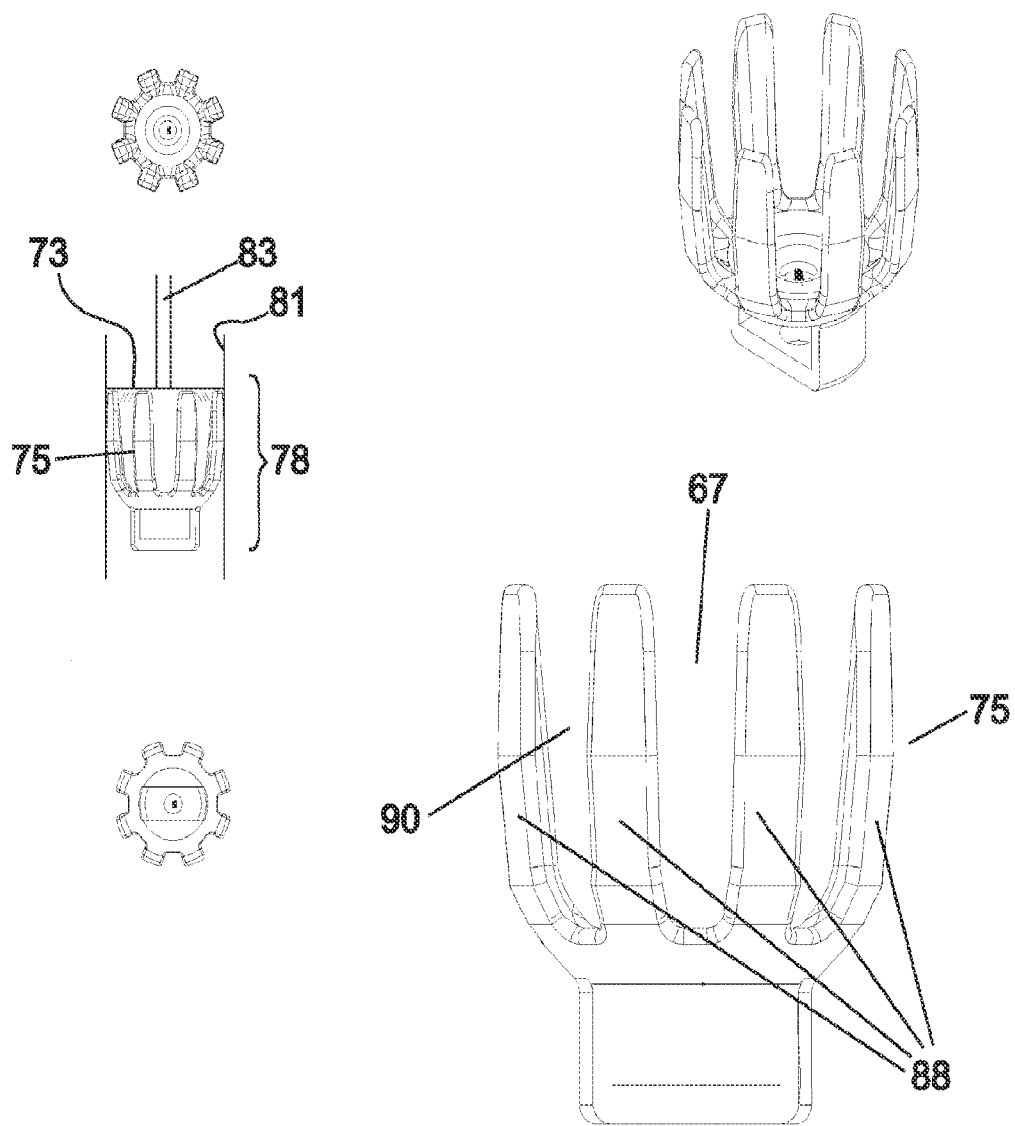
FIG. 22 shows views of the friction wedge, and the wedge base, in an embodiment of the inventive telescoping tube position lock apparatus.
Figure 23:
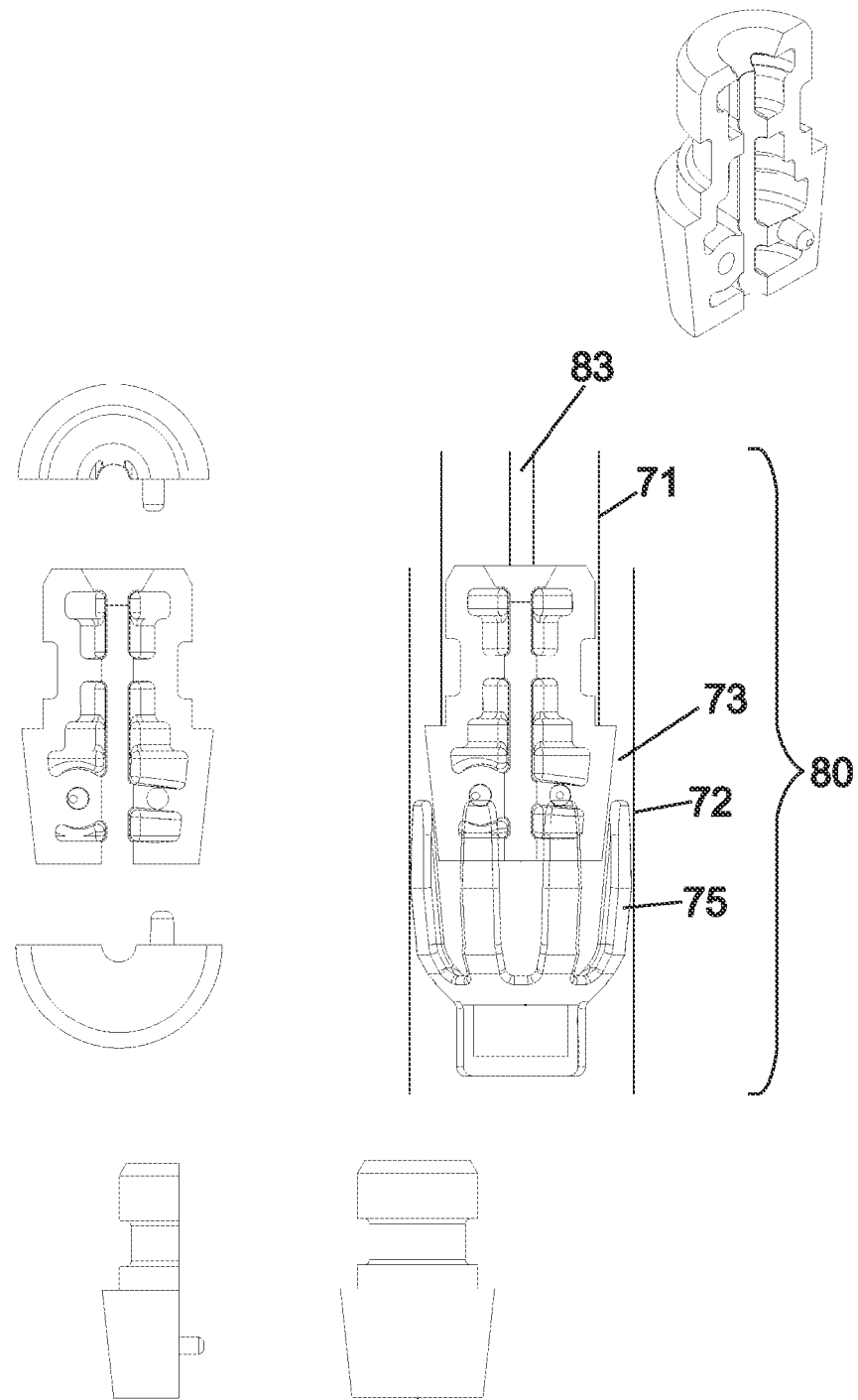
FIG. 23 shows views of the friction wedge, and the wedge base, in an embodiment of the inventive telescoping tube position lock apparatus.
Figure 24:
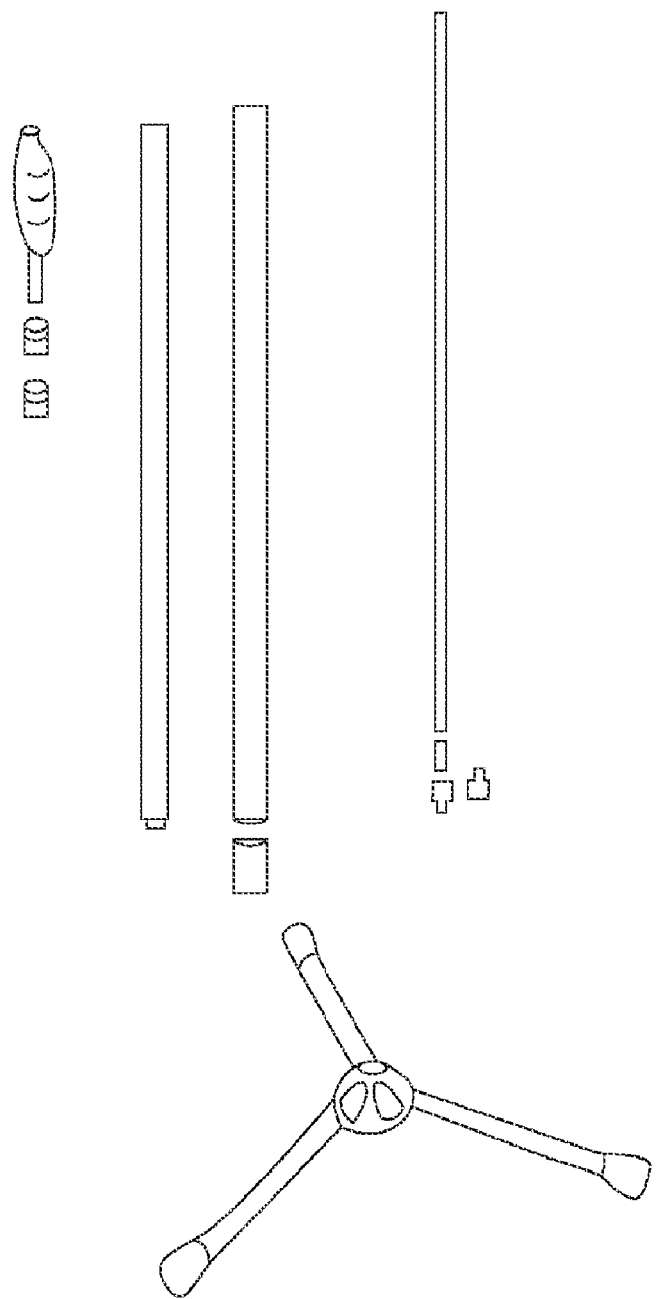
FIG. 24 shows an exploded view of a stand in which an embodiment of the inventive telescoping tube position lock apparatus may find application.
Figure 25:
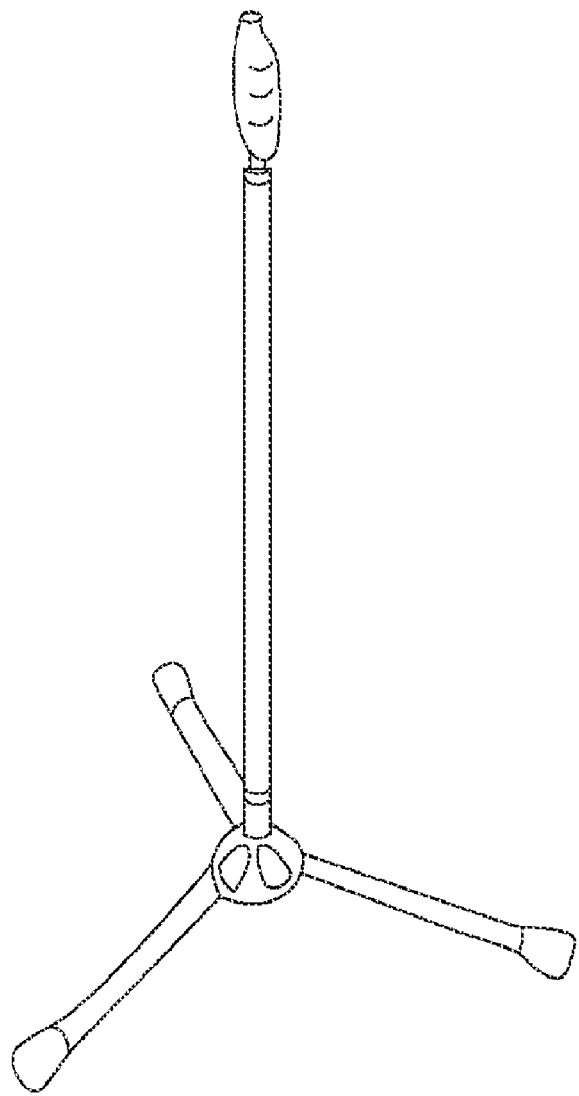
FIG. 25 shows a view of a stand in which an embodiment of the inventive telescoping tube position lock apparatus may find application.
Figure 26:
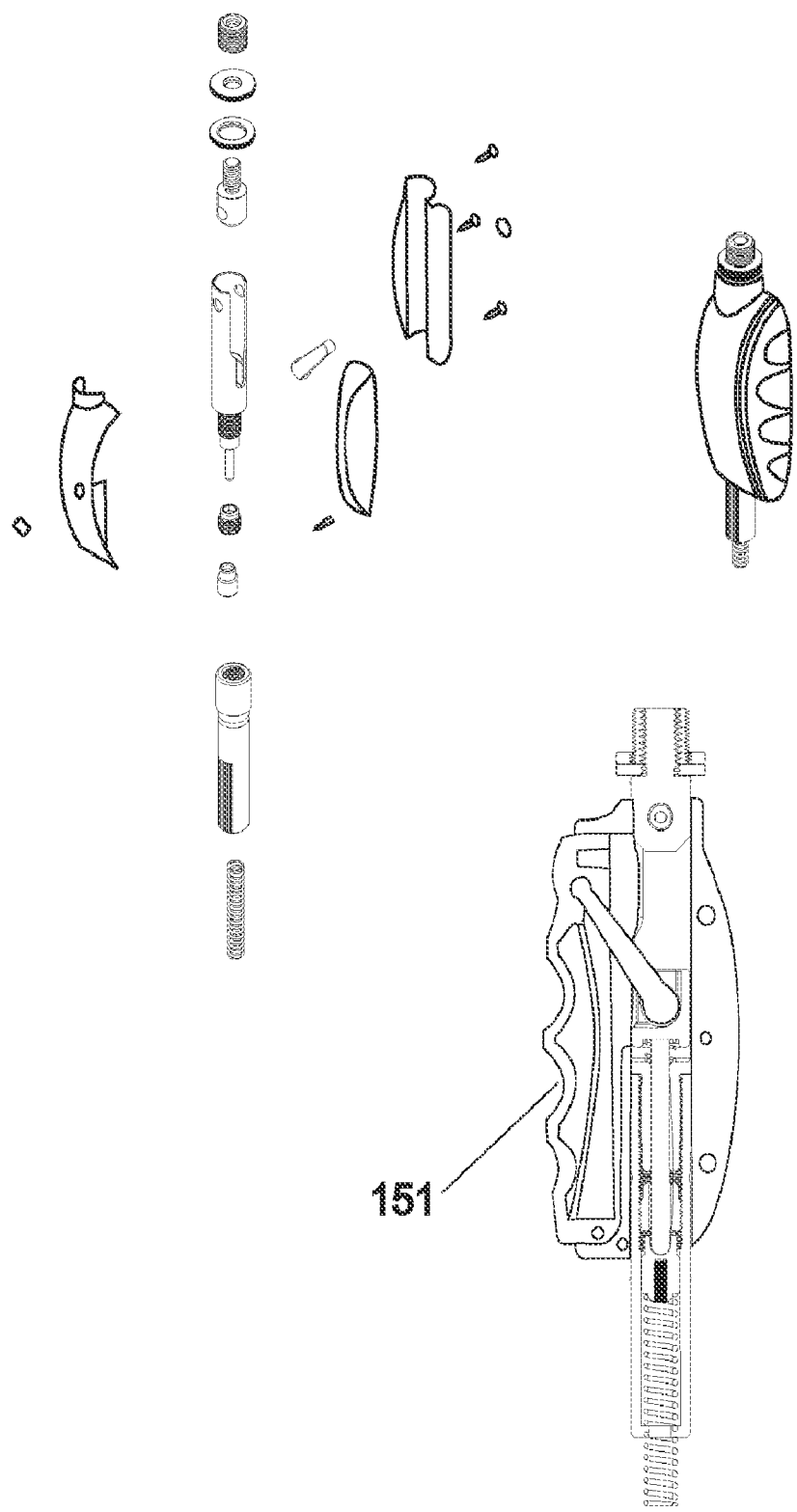
FIG. 26 shows a squeeze trigger that might find application in a stand incorporating the inventive telescoping tube position lock apparatus.

At least one embodiment of the inventive technology may be described as a telescoping tube position lock apparatus 70 that comprises a first tube 71 at least partially nested in a second tube 72; an inner wedge base 73 established substantially at an end 74 of the first tube; and a friction wedge 75 that is established so that a concave side 76 thereof faces the first tube, that is biased towards an inner wedge distal portion 77 of the first tube (e.g., an end portion of the first tube that is furthest from the inner wedge), and that is reconfigurable from a pressure wedge configuration 78 when the apparatus is in a tube lock mode (where the tubes are substantially axially immovable relative to each other) to a release configuration 80 when the apparatus is in a relative tube position adjustment mode, where, when the friction wedge is in the pressure wedge configuration, at least a portion of the friction wedge is pressurized between the inner wedge base and an interior surface 81 of the second tube, and where the friction wedge is positionally responsive to a manual controller 82 (e.g., so that movement of the manual controller effects a positional change or movement of the friction wedge) that enables manual reconfiguration of the apparatus between the tube lock mode and the relative tube position adjustment mode. Certain embodiments may further comprise a user activatable rod 83 (a rod that may be activated by a user, using the manual controller) that passes through at least a portion of the first tube; the friction wedge may be attached to such rod. Certain other embodiments with a cable (instead of a rod) may rely on a bias force applied at the site of the wedge base and the friction wedge (instead of up at the manual controller). In embodiments with a user activatable rod, such rod may be attached to the manual controller; when such controller is a squeeze trigger (as but one example), the rod may be activatable with one hand. In certain embodiments, the user activatable rod is biased towards an inner wedge base distal portion of the first tube (e.g., an end portion of the first tube that is furthest from the inner wedge base). In certain embodiments, the user activatable rod is upwardly biased (see, e.g., FIG. 21); such bias, again, may be provided by a spring (or other biaser) as part of the manual controller (e.g., a squeeze trigger 151, which may provide an bias force as shown).

Of course, in certain embodiments, the telescoping tube position lock apparatus is a stand (e.g., a microphone stand apparatus). However, the inventive technology may find application whenever the relative position of two tubes, one at least partially nested in the other, must be adjusted and locked at a desired relative position. The manual controller may be a squeeze trigger (such that a one hand squeeze effects reconfiguration of the apparatus). Particularly where the apparatus is a stand, the first tube may be an upper tube and the second tube may be a lower tube (see FIG. 21). The friction wedge may be multi-pronged (e.g., it may have at least three prongs, at least four prongs, at least five prongs, at least six prongs, at least seven prongs, at least eight prongs). Further, the inner wedge base may be frustoconical and point towards a non-nesting end of the second tube.

Another related set of at least one embodiment of the inventive technology is a telescoping tube position lock apparatus that comprises: a first tube 71 at least partially nested in a second tube 72; and an inner wedge base 73 and a friction wedge 75 cooperatively established substantially at an end of the first tube; and a manual controller 82 (e.g. a spring loaded squeeze trigger 151 operable with one hand) that enables reconfiguration of the apparatus between a tube lock mode and relative tube position adjustment mode, where, when the apparatus is in a tube lock mode, at least a portion of the friction wedge is pressurized between the inner wedge base and an interior surface of the second tube, and where the friction wedge comprises at least three prongs 88. By cooperatively established is meant that the wedge and the wedge base are relatively positioned so that the wedge may be pressuredly forced between the wedge base and the inner surface of the second tube so as to provide a locking force that precludes relative axial movement of the two tubes. In particular embodiments, the first tube is an upper tube and the second tube is a lower tube.

Further, the friction wedge may be reconfigurable from a pressure wedge configuration during the tube lock mode to a release configuration during the relative tube position adjustment mode. In certain embodiments (e.g., FIG. 21), the friction wedge is positionally responsive to the manual controller (in other embodiments, the wedge base may be so responsive). Further, the friction wedge may be established so that a concave side thereof faces the first tube. The friction wedge may be biased towards an inner wedge distal portion of the first tube 77; particularly where the apparatus is a stand apparatus (e.g., where it forms part of a stand such as a microphone stand), the user activatable rod may be upwardly biased.

Also, again particularly where the apparatus is a stand apparatus (although certainly non-stand applications may exhibit the following features), a user activatable rod 83 may pass through at least a portion of the first tube; the friction wedge may be attached to such user activatable rod, and to the manual controller. In certain embodiments, the user activatable rod is activatable with one hand via the manual controller. The inner wedge base may be frustoconical and point towards a non-nesting end 89 of the second tube (i.e., an end of the second tube that does not include therein the first tube).

It is note that in certain embodiments, the upper tube of the telescoping tube position lock apparatus can be spun without tightening or loosening. Further, the term tube includes shafts of a variety of cross-sections—circular, oval, octagonal, square, rectangular, pentagonal, septagonal, hexagonal—as but a few examples. It is also of note that when the concave side of the friction wedge faces towards the weight application side (upwards in a mic stand, as a performer may apply a large portion of his/her body weight downwards on the apparatus), such configuration tends to give a tighter lock against slippage under such weight. Again, it should be understood that the inventive technology is not limited in application to merely stands (e.g., mic stands), but indeed may be usable whenever there is a need to lock the relative position of two tubes (one at least partially nested in the other) as desired after an adjustment of the position of one tube relative to the other.

As should be understood, the prongs during lock mode 88 (e.g., fingers) of the friction wedge are wedged between the wedge base and an inner surface of the tube in which one tube is nested. In certain embodiments, the friction wedge is axially repositioned so that it is wedged against a stationary wedge base. The bias may maintain this position, and (again, only in certain embodiments) repositioning of the friction wedge away from the wedge base, against the bias force, such that the wedge (specifically the prongs of the wedge) is no longer pressured between the wedge base and the interior of one of the tubes, allows for adjustment of the relative position of the two tubes. Such release—allowing the aforementioned adjustment—may, in certain embodiments, be effected by, e.g., squeezing a squeeze trigger, thereby forcing the internal bar down against an upward bias force (provided by a spring in the squeeze trigger), and unwedging the wedge. When such trigger is released in such particular embodiments, the bias force takes effect and the wedge is forced upwards, back into pressure wedge configuration so that the apparatus is in a tube lock mode. It is also of note that in the three or more pronged wedge embodiments, the spatial gaps 90 between the prongs allow for more facile flexing outwards and inwards (in a radial direction) of the prongs, which may facilitate achievement and release of a pressure wedge, and enhance smooth operation of the apparatus. Also, such gaps enable the friction wedge to easily avoid the axial joint seam found on the inside of steel tubing. Such interference may be annoying to an operator during travel of the wedge during release configuration (indeed, it may inhibit free travel during adjustment), or may compromise locking during a tube lock mode.

Figure 27:
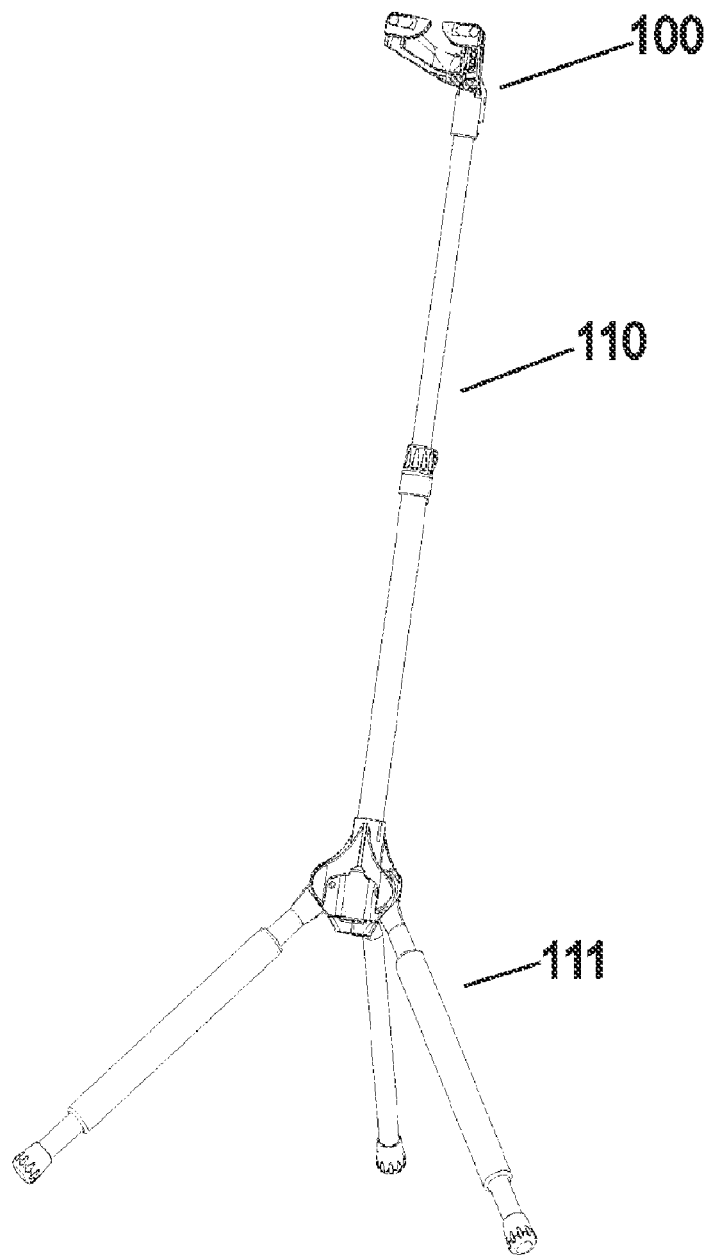
FIG. 27 shows a perspective view of a stand incorporating an embodiment of the inventive item support apparatus.
Figure 28:
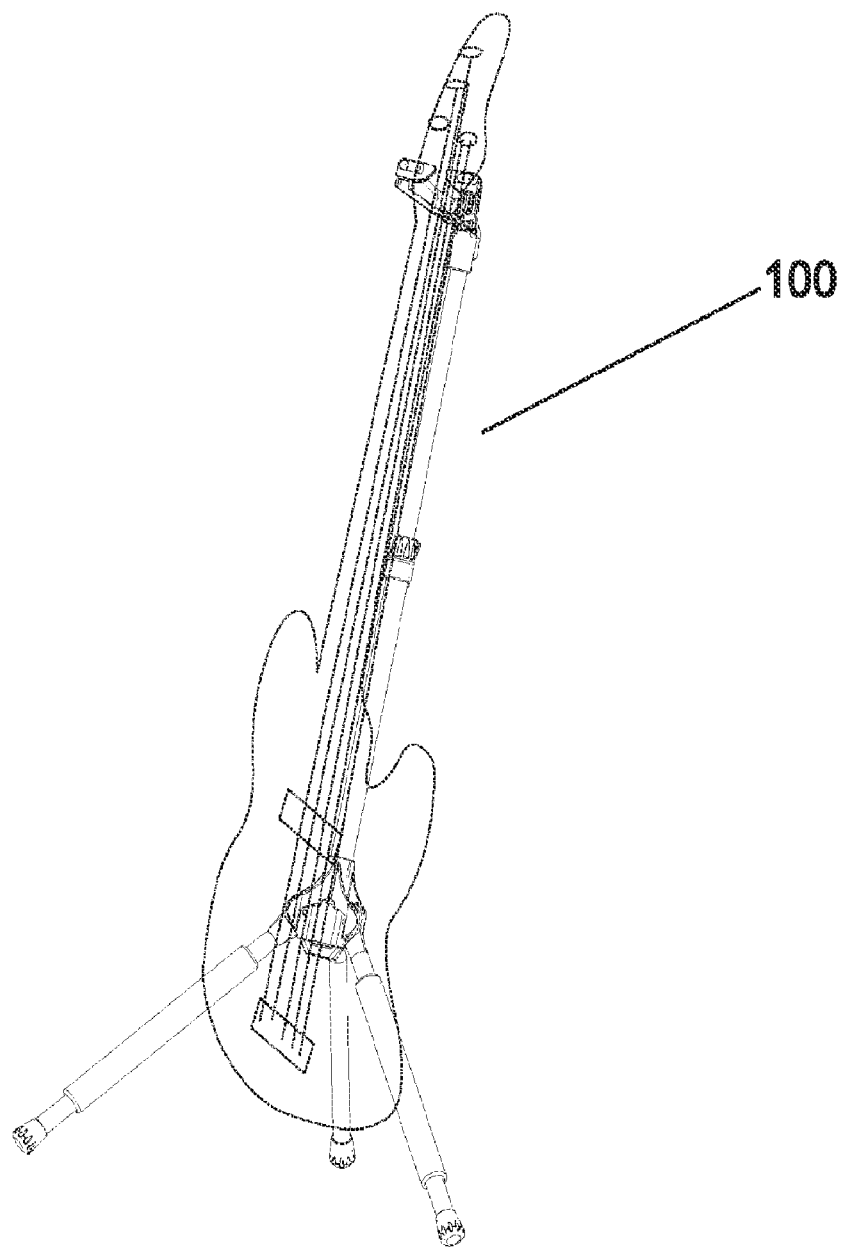
FIG. 28 shows a perspective view of a stand incorporating an embodiment of the inventive item support apparatus supporting a guitar.
Figure 29:
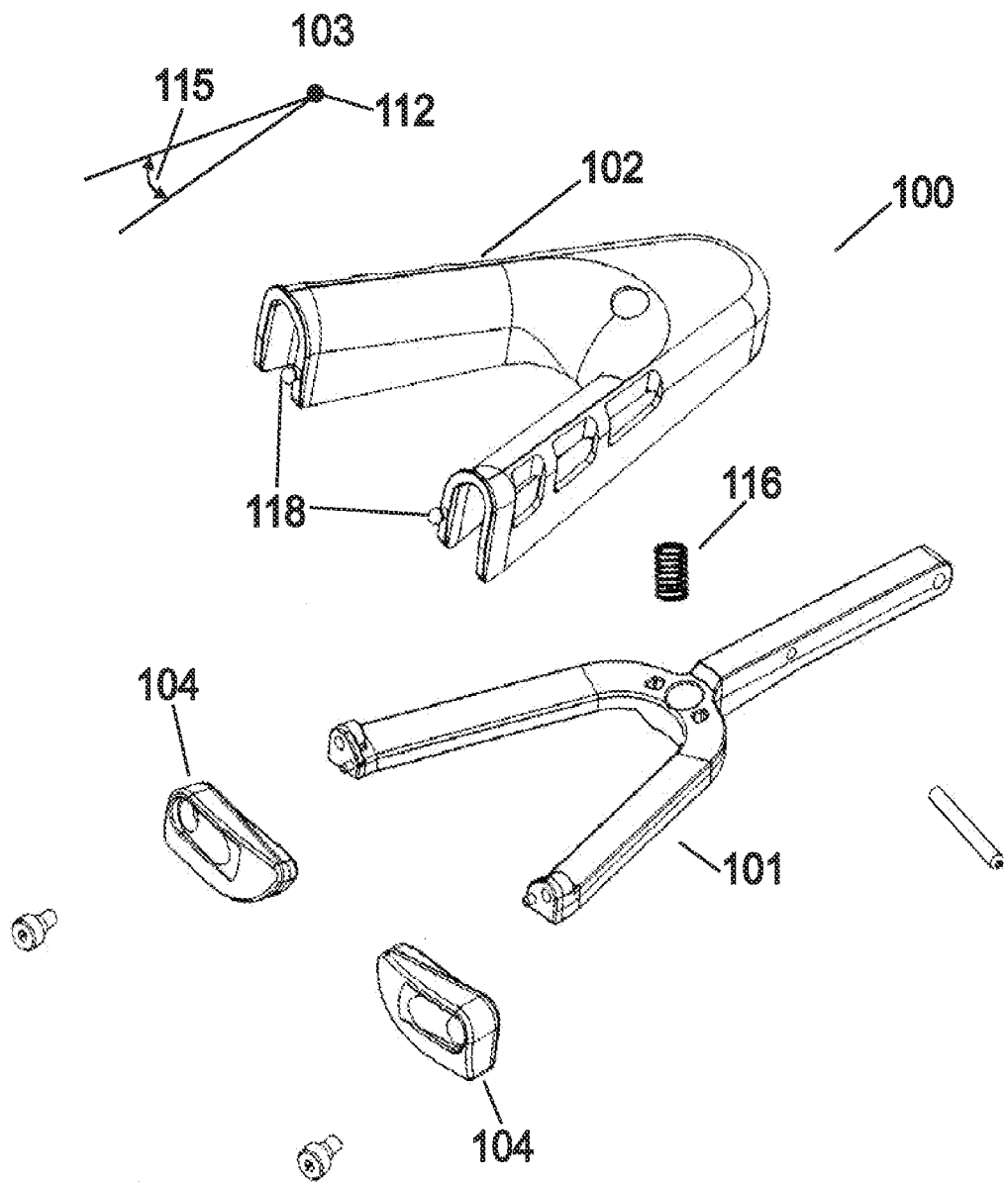
FIG. 29 shows an exploded view of an embodiment of the inventive item support apparatus.
Figure 30:
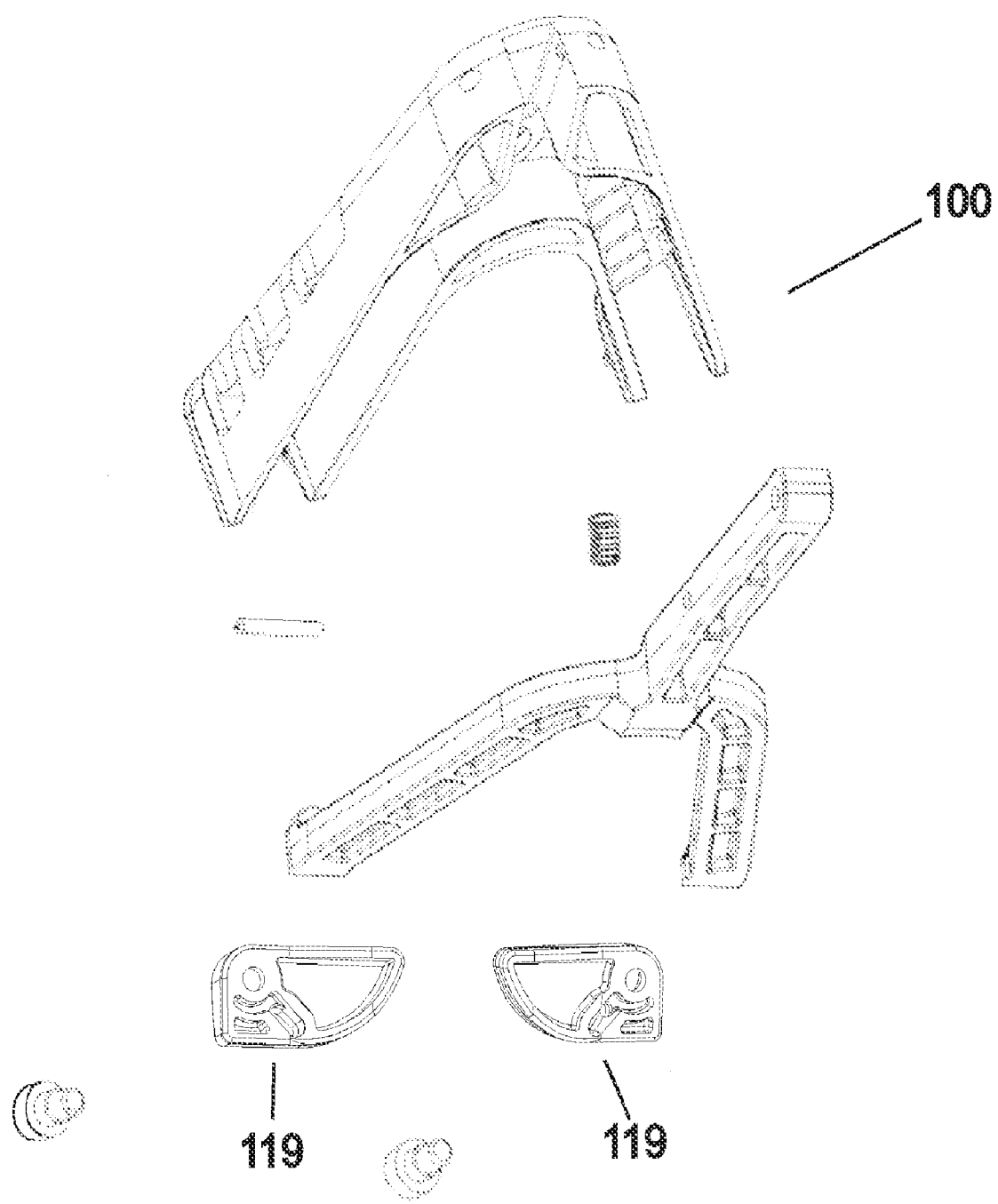
FIG. 30 shows an exploded view, from the rear, of an embodiment of the inventive item support apparatus.
Figure 31:
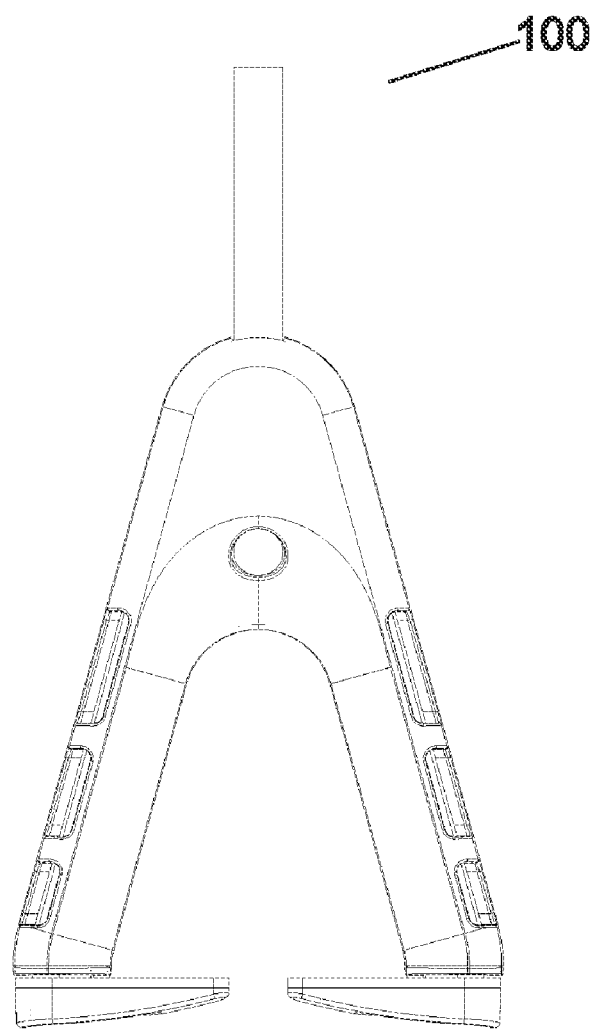
FIG. 31 shows a top view of an embodiment of the inventive item support apparatus in item support augmentation mode.
Figure 32:
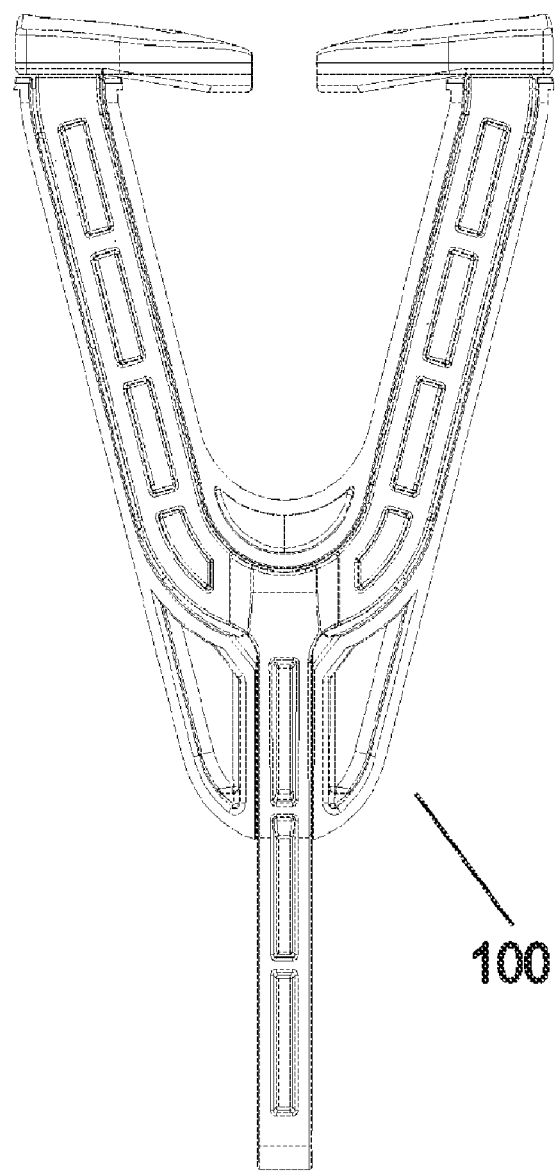
FIG. 32 shows a bottom view of an embodiment of the inventive item support apparatus in item support augmentation mode.
Figure 33:
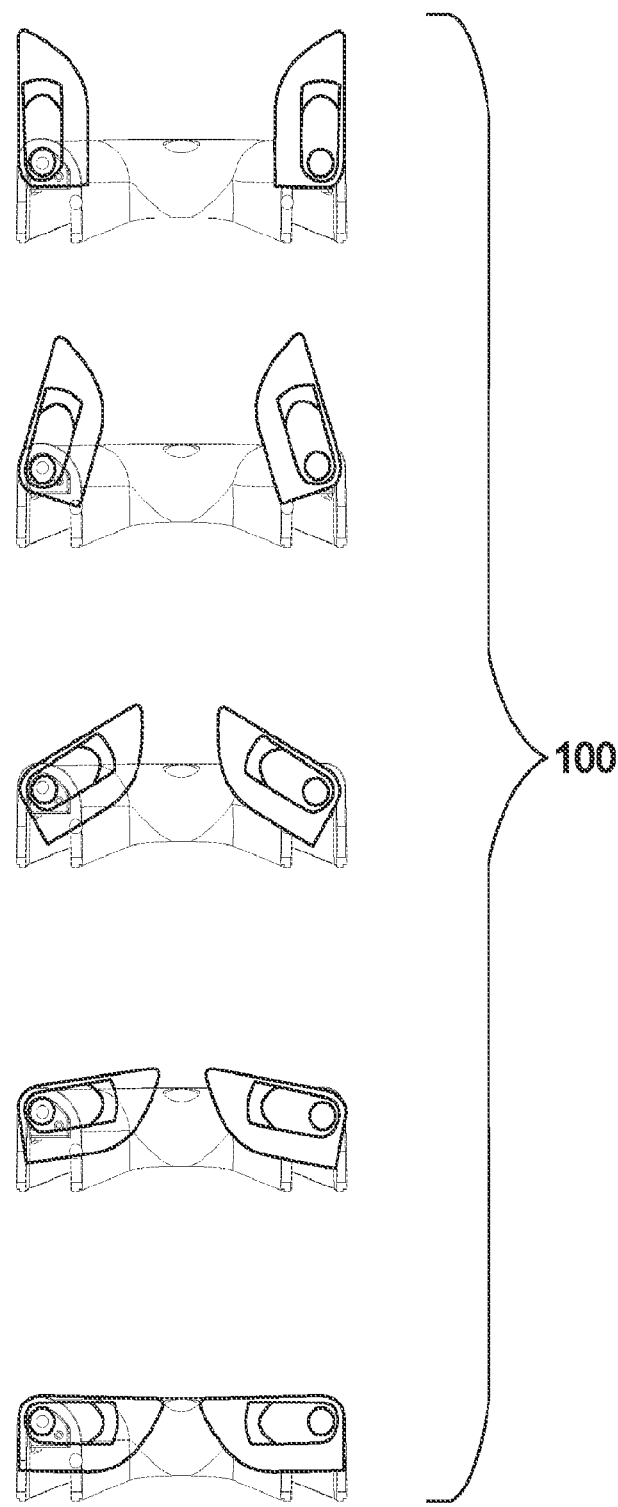
FIG. 33 shows views depicting progression of an embodiment of the inventive item support apparatus to item support augmentation mode, as may be seem upon placement of a guitar in the apparatus.
Figure 34:
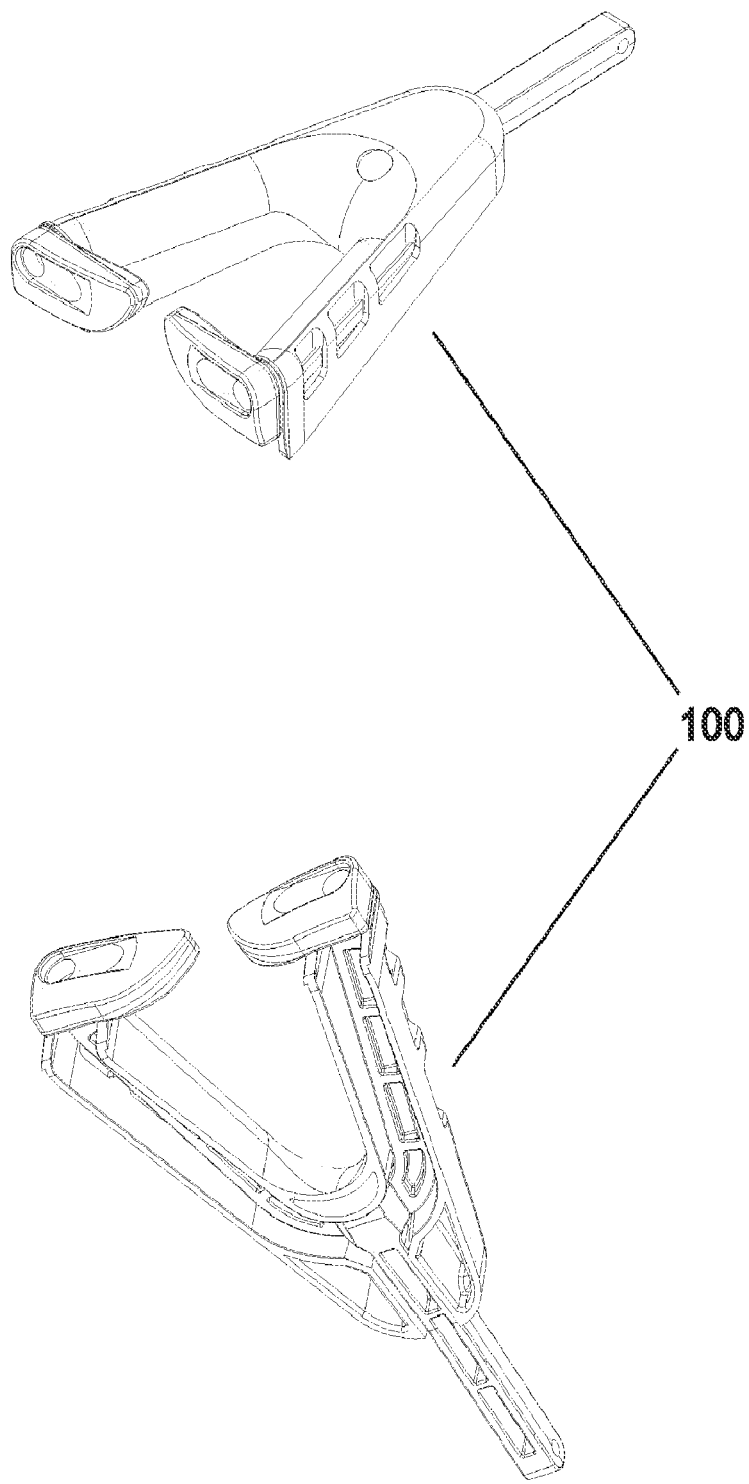
FIG. 34 shows two perspective views of an embodiment of the inventive item support apparatus in item support augmentation mode.
Figure 35:
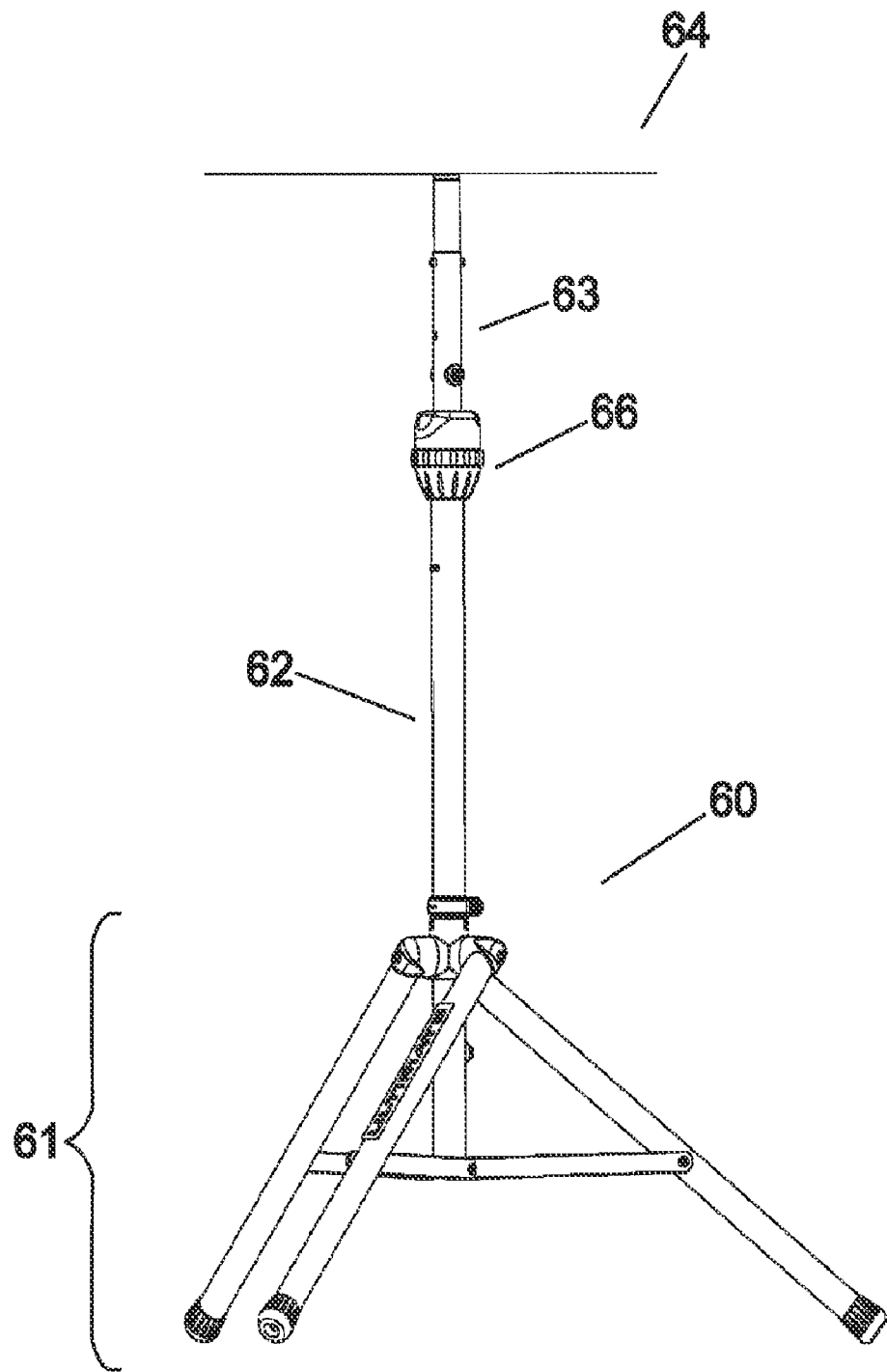
FIG. 35 shows a side view of an embodiment of a sound speaker support apparatus.
Figure 36:
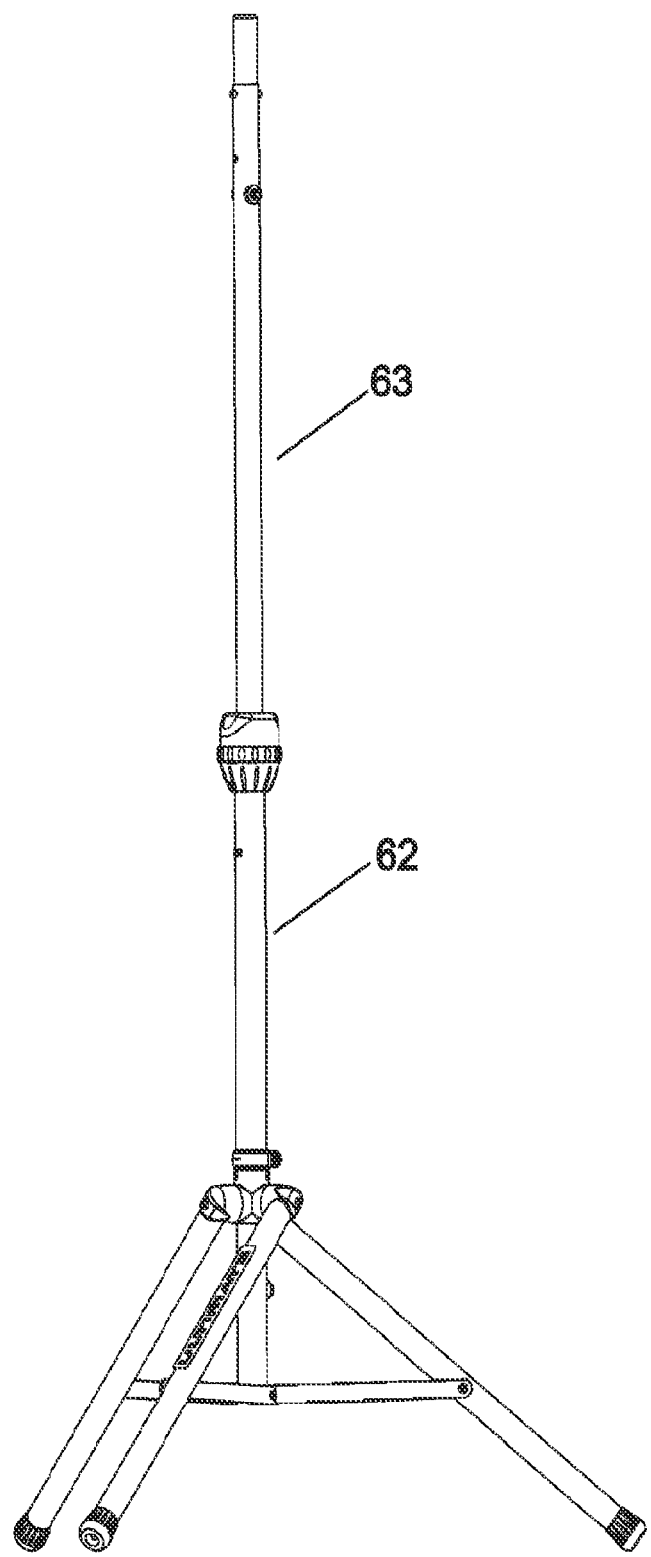
FIG. 36 shows a side view of an embodiment of a sound speaker support apparatus.
Figure 37:
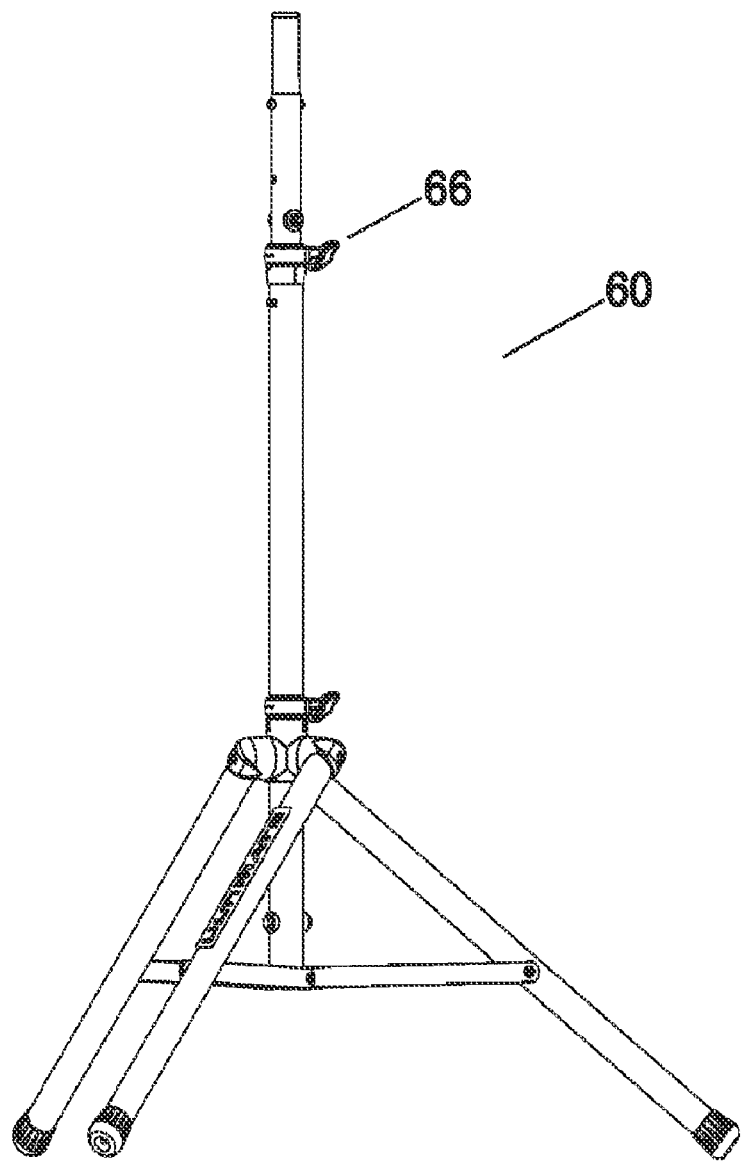
FIG. 37 shows a side view of an embodiment of a sound speaker support apparatus.
Figure 38:
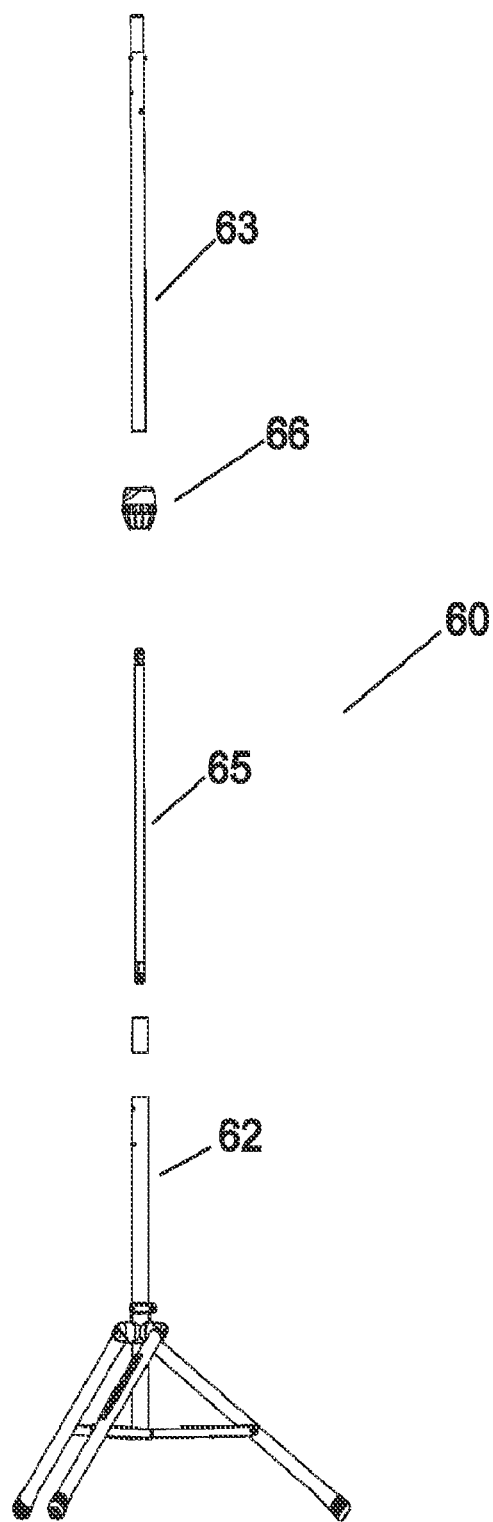
FIG. 38 shows a side exploded view of an embodiment of a sound speaker support apparatus.
Figure 39:
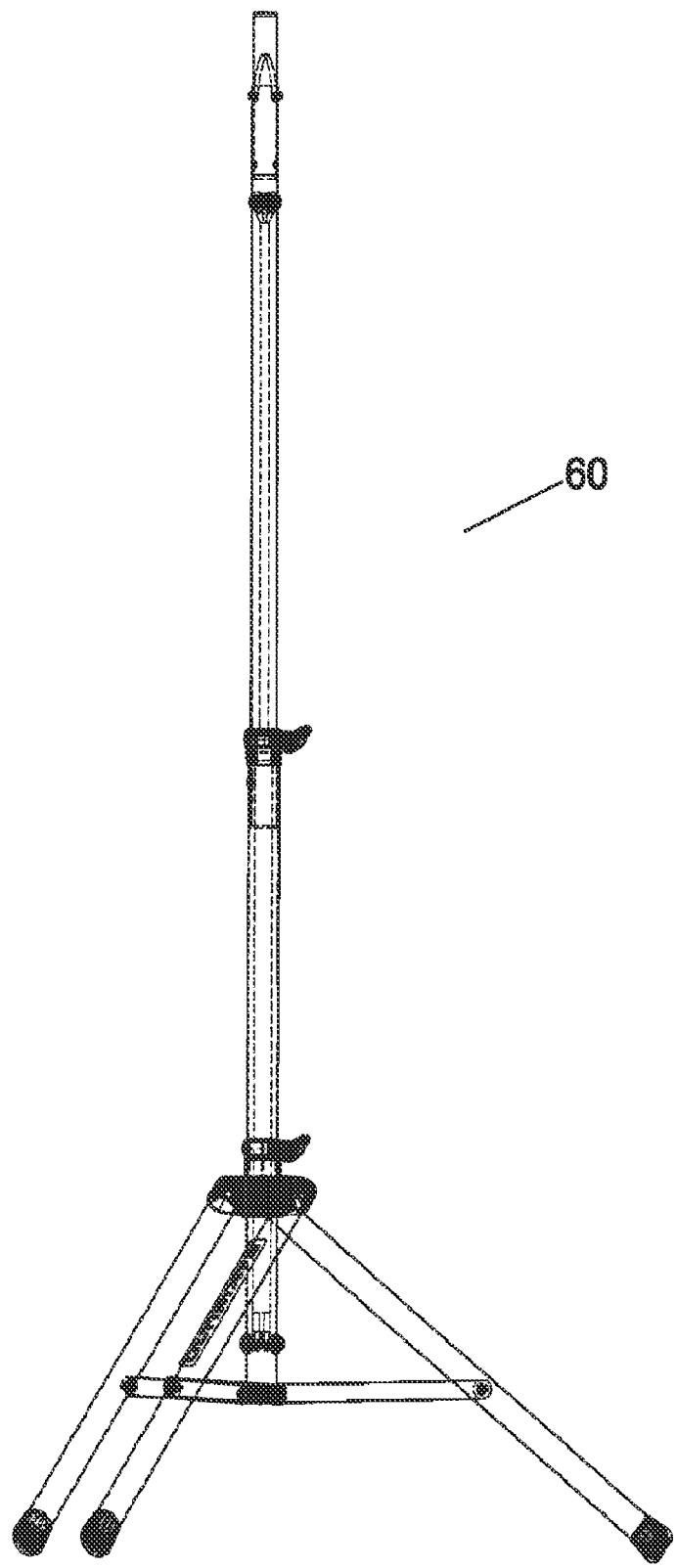
FIG. 39 shows a side view of an embodiment of a sound speaker support apparatus.

At least one embodiment of the inventive technology may be described as an item support apparatus 100 that comprises an item support yoke base 101; an item weight pivotable, support yoke portion 102 that is established above the item support yoke base and that is angularly movable 103 relative to the item support yoke base (see FIG. 33 for a front view of such angular motion); and at least one retainer responsive to the item weight pivotable, support yoke portion such that placement of an item into the guitar support apparatus effects movement of the at least one retainer to an item support augmentation mode (see FIG. 27) and unweighting of the item from the item support apparatus effects movement of the at least one retainer from the item support augmentation mode, where the item weight pivotable, support yoke portion is upwardly biased. The item weight pivotable, support yoke portion is a support yoke portion (such may include two yoke shaped (e.g., y shaped) parts) that pivots upon application of an item to it because of the item's weight. The item support augmentation mode refers to that configuration where the item's retention in the yoke is augmented or supplemented by, e.g., retainers (such as wings; see FIGS. 27 and 29). As can be readily appreciated, such retention mitigates the risk that the supported item will fall out of the stand when it is hit or moved; as such, this apparatus may reduce the odds of impact caused damage. It is of note that, regardless of the type of item supported, typically the item will have a width enhanced portion (e.g., the headstock of a guitar) that can rest in the yoke. The term yoke does not require any particular shape, but often has a Y or U shape.

In at least one embodiment of the inventive technology, the item support yoke base is attached to an upright support member 110; such is often found when the apparatus is a stand apparatus (e.g., a guitar stand apparatus). Such embodiments may further comprise a stand base 111 established below the upright support member. In other embodiments, the item support yoke base is attachable to a wall; support augmentation may be desired when such wall moves, as may be found when such wall is on the inside of a vehicle such as a moving van. In certain embodiments, at least one retainer (one larger, or two smaller retainers such as wings, e.g.) is pivotally responsive to movement of the item weight pivotable, support yoke portion, and the item weight pivotable, support yoke portion is angularly movable about a single point 112, relative to the item support yoke base. Further, the item weight pivotable, support yoke portion may be angularly movable, in non-translatory fashion, relative to the item support yoke base (in such embodiments, the movement effected by placement of the item into the apparatus would effect a pure rotation motion 115, and not a motion that includes any translation, of the item weight pivotable, support yoke portion relative to the item support yoke base).

The item weight pivotable, support yoke portion is typically upwardly biased; this may be provided by a spring 116 established between the item weight pivotable, support yoke portion and the item support yoke base. In certain embodiments, the apparatus may further comprise at least one pin 118 and at least one corresponding track 119 configured to effect the movement of the at least one retainer to and from the item support augmentation mode. Thus (and due also to the upward bias), at least one retainer may be responsive to the item weight pivotable, support yoke portion such that placement of an item into the guitar support apparatus effects movement (e.g., pivotal movement) of the at least one retainer to an item support augmentation mode and unweighting of the item from the item support apparatus effects movement of the at least one retainer from the item support augmentation mode. In certain embodiments, the at least one pin is attached to the item weight pivotable, support yoke portion and the at least one corresponding track is of the at least one retainer.

As can be easily understood from the foregoing, the basic concepts of the present invention may be embodied in a variety of ways. It involves both support techniques as well as devices to accomplish the appropriate support. In this application, the support techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "support" and even a "means for supporting" Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the support devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A keyboard stand apparatus, comprising:
an upright rear support;
two lower keyboard supports that, when said apparatus is in a support configuration, are established forward of said upright rear support and define a lower keyboard support surface having a first angle relative to horizontal,
two upper keyboard supports that, when said apparatus is in said support configuration, are established forward of said upright rear support and above said two lower keyboard supports, and define an upper keyboard support surface having a second angle relative to horizontal, and
a support base established to support said upright rear support when said apparatus is in a support configuration,
wherein said two lower keyboard supports and said two upper keyboard supports are independently angularly adjustable so that said first angle and said second angle are adjustable to an operator preferred first angle and an operator preferred second angle, respectively,
wherein said two lower keyboard supports have upright rear support proximal ends that are height adjustable to an operator preferred lower keyboard support height,
wherein said two upper keyboard supports have upright rear support proximal ends that are height adjustable to an operator preferred upper keyboard support height,
wherein said two upper keyboard supports each have an upright rear support distal end,
wherein said two lower keyboard supports and said two upper keyboard supports are length adjustable to operator preferred lower keyboard support lengths and operator preferred upper keyboard support lengths, respectively, and
wherein settings for each said operator preferred first angle, said operator preferred second angle, said operator preferred lower keyboard support height, said operator preferred upper keyboard support height, said operator preferred lower keyboard support lengths and said operator preferred upper keyboard support lengths are automatically retainable from a first support mode through a subsequent storage mode to a later support mode,
said keyboard stand apparatus further comprising end stops established at said upright rear support distal ends of said two upper keyboard supports, wherein said end stops are manually pivotable end stops that are manually pivotable between a keyboard obstruction mode and a keyboard non-obstruction mode.

2. A keyboard stand apparatus as described in claim 1 said support base comprises feet.

3. A keyboard stand apparatus as described in claim 1 further comprising at least one power cable retainer that is operable to hold electrical power cables to said upright rear support during keyboard use.

4. A keyboard stand apparatus as described in claim 1 further comprising a support height column established above said support base, a plurality of holes disposed along said support height column, and at least one hole insertable part, each associated with at least one of said keyboard supports, wherein each said at least one hole insertable part is insertable into a selected hole corresponding to an operator preferred support height.

5. A keyboard stand apparatus, comprising:

an upright rear support;

two keyboard supports that, when said apparatus is in a support configuration, are established forward of said upright rear support and define a keyboard support surface having an angle relative to horizontal; and a support base established to support said upright rear support when said apparatus is in a support configuration; and manually pivotable end stops, each established at an upright rear support distal end of a different one of said keyboard supports, wherein upright rear support proximal ends of said two keyboard supports are height adjustable, wherein each of said manually pivotable end stops are manually pivotable between a keyboard obstruction mode and non-obstruction mode.

6. A keyboard stand apparatus as described in claim 5 wherein said two keyboard supports are two lower keyboard supports, said keyboard support surface is a lower keyboard support surface, and said angle relative to horizontal is a first angle relative to horizontal, and further comprising two upper keyboard supports that, when said apparatus is in said support configuration, are established forward of said upright rear support, above said two lower keyboard supports and define an upper keyboard support surface having a second angle relative to horizontal.

7. A keyboard stand apparatus as described in claim 6 wherein upright rear support proximal ends of said two upper keyboard supports are height adjustable.

8. A keyboard stand apparatus as described in claim 6 wherein said manually pivotable end stops are each established at an upright rear support distal end of a different one of said upper keyboard supports.

9. A keyboard stand apparatus as described in claim 5 wherein each of said keyboard supports is adjustable to operator preferred lengths.

* * * * *